United States Patent
Shindo et al.

(10) Patent No.: US 11,130,855 B2
(45) Date of Patent: Sep. 28, 2021

(54) COMPOSITION FOR FORMING RELEASE LAYER, AND RELEASE LAYER

(71) Applicant: NISSAN CHEMICAL CORPORATION, Tokyo (JP)

(72) Inventors: Kazuya Shindo, Funabashi (JP); Tokio Nishita, Toyama (JP); Kazuya Ebara, Funabashi (JP); BangChing Ho, Kaohsiung (TW)

(73) Assignee: NISSAN CHEMICAL CORPORATION, Tokyo (JP)

( * ) Notice: Subject to any disclaimer, the term of this patent is extended or adjusted under 35 U.S.C. 154(b) by 65 days.

(21) Appl. No.: 16/633,868

(22) PCT Filed: Jul. 26, 2018

(86) PCT No.: PCT/JP2018/028043
§ 371 (c)(1),
(2) Date: Jan. 24, 2020

(87) PCT Pub. No.: WO2019/022185
PCT Pub. Date: Jan. 31, 2019

(65) Prior Publication Data
US 2020/0239679 A1 Jul. 30, 2020

(30) Foreign Application Priority Data

Jul. 27, 2017 (JP) .............................. JP2017-145669
Jun. 6, 2018 (JP) .............................. JP2018-108670
Jun. 6, 2018 (JP) .............................. JP2018-108687

(51) Int. Cl.
| C08L 33/14 | (2006.01) |
| C08L 45/00 | (2006.01) |
| C08G 71/02 | (2006.01) |
| C08L 27/12 | (2006.01) |

(Continued)

(52) U.S. Cl.
CPC .............. C08L 33/14 (2013.01); B32B 27/00 (2013.01); C08G 71/02 (2013.01); C08K 5/16 (2013.01);
(Continued)

(58) Field of Classification Search
None
See application file for complete search history.

(56) References Cited
U.S. PATENT DOCUMENTS 9,240,327 B2 * 1/2016 Sakamoto ........... H01L 21/3086
2007/0196763 A1 * 8/2007 Araki .................... G03F 7/0046
430/256

(Continued)

FOREIGN PATENT DOCUMENTS

JP 2004506810 A * 3/2004
JP 2009-205924 A 9/2009
(Continued)

OTHER PUBLICATIONS

International Search Report issued in PCT/JP2018/028043 (PCT/ISA/210), dated Oct. 9, 2018.
(Continued)

Primary Examiner — Nicole M. Buie-Hatcher
(74) Attorney, Agent, or Firm — Birch, Stewart, Kolasch & Birch, LLP

(57) ABSTRACT

Provided is a composition for forming release layers which comprises (A) a polyurea including a repeating unit represented by formula (1), (B) an acid compound or a salt thereof, (C) a crosslinking agent selected from among compounds having a nitrogen atom substituted by a hydroxyalkyl group and/or an alkoxymethyl group, (D) a polymeric additive including a repeating unit represented by formula (a1), a repeating unit represented by formula (b), and a repeating unit represented by formula (c), and (E) a solvent, wherein the polymeric additive (D) is contained in an amount of 5-100 parts by mass per 100 parts by mass of the polyurea (A).

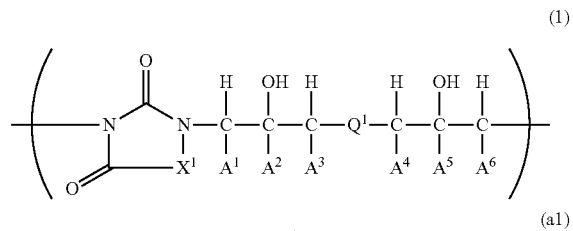

(1)

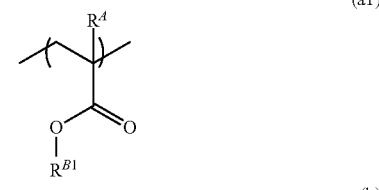

(a1)

(b)

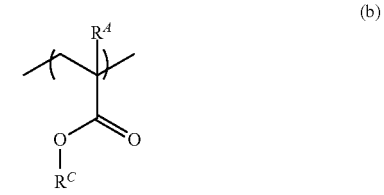

(c)

(Continued)

(In the formulae, the $R^A$ moieties each are independently a hydrogen atom or a methyl group; $R^{B1}$ is a branched $C_{3-4}$ alkyl group in which at least one hydrogen atom has been replaced with a fluorine atom; $R^C$ is a $C_{1-10}$ hydroxyalkyl group; and $R^D$ is a $C_{6-20}$ polycycloalkyl group or $C_{6-12}$ aryl group.)

13 Claims, No Drawings

(51) Int. Cl.
*C08L 79/04* (2006.01)
*C09D 133/14* (2006.01)
*B32B 27/00* (2006.01)
*C08K 5/16* (2006.01)
*C08K 5/42* (2006.01)

(52) U.S. Cl.
CPC .............. *C08K 5/42* (2013.01); *C08L 27/12* (2013.01); *C08L 45/00* (2013.01); *C08L 79/04* (2013.01); *C09D 133/14* (2013.01)

(56) References Cited

U.S. PATENT DOCUMENTS

| | | |
|---|---|---|
| 2008/0143906 A1 | 6/2008 | Allemand et al. |
| 2013/0056440 A1 | 3/2013 | Iwase et al. |
| 2015/0017791 A1 | 1/2015 | Ohashi et al. |
| 2016/0147152 A1 | 5/2016 | Fujitani et al. |
| 2016/0279565 A1 | 9/2016 | Cohen et al. |
| 2016/0326396 A1* | 11/2016 | Nishimaki ............... G03F 7/32 |
| 2016/0347965 A1* | 12/2016 | Umezaki .................. G03F 7/20 |
| 2016/0363863 A1* | 12/2016 | Sakaida ............... C09D 133/14 |
| 2017/0108777 A1* | 4/2017 | Hashimoto ........... C08F 220/22 |

FOREIGN PATENT DOCUMENTS

| | | |
|---|---|---|
| JP | 2009-283410 A | 12/2009 |
| JP | 2010-507199 A | 3/2010 |
| JP | 2015-166145 A | 9/2015 |
| JP | 2016-531358 A | 10/2016 |
| WO | WO 2012/147235 A1 | 11/2012 |
| WO | WO 2013/118879 A1 | 8/2013 |
| WO | WO 2015/012172 A1 | 1/2015 |
| WO | WO 2016/160338 A1 | 10/2016 |
| WO | WO 2017/002664 A1 | 1/2017 |
| WO | WO-2018052127 A1 * | 3/2018 ............. G03F 7/162 |

OTHER PUBLICATIONS

Written Opinion of the International Searching Authority issued in PCT/JP2018/028043 (PCT/ISA/237), dated Oct. 9, 2018.

* cited by examiner

COMPOSITION FOR FORMING RELEASE LAYER, AND RELEASE LAYER

TECHNICAL FIELD

The present invention relates to a release layer-forming composition, and a release layer.

BACKGROUND ART

These days, it is desired that an electronic device be provided with the function of capability of bending, in addition to the characteristics of thickness reduction and weight reduction. From this fact, it is desired to use a lightweight, flexible plastic substrate in place of a conventional heavy, fragile, unbendable glass substrate.

In particular, in new-generation displays, the development of an active matrix-type full color TFT display panel using a lightweight, flexible plastic substrate (hereinafter, also referred to as a resin substrate) is desired. Further, for touch panel displays, materials adapted to flexibility increase, such as a transparent electrode and a resin substrate of a touch panel used in combination with a display panel, are developed. As the transparent electrode, as well as conventionally used ITO, other transparent electrode materials, such as transparent electroconductive polymers and metal nanowires, and mixed systems thereof that can be processed by bending, including PEDOT and the like, are proposed (Patent Documents 1 to 4).

On the other hand, also the substrate of a touch panel film has been changed from glass to a sheet or the like made of a plastic such as polyethylene terephthalate (PET), a polyimide, a cycloolefin, or an acrylic, and transparent flexible-material-made touch screen panels provided with flexibility are developed (Patent Documents 5 to 7).

In general, a flexible-material-made touch screen panel is produced by producing a release (adhesive) layer on a support substrate such as a glass substrate, fabricating a device on the release layer, and then performing release, in order to achieve productivity and releasability stably (Patent Document 8). The release layer should not be released from the support substrate during the course, but is needed to have low release force at the time of release. Further, after the release layer is formed as a film, it needs to be stored for a long time in a film-manufactured state, in order to improve productivity. Hence, the release layer is needed to have stability after film formation.

PRIOR ART DOCUMENTS

Patent Documents

Patent Document 1: WO 2012/147235
Patent Document 2: JP-A 2009-283410
Patent Document 3: JP-A 2010-507199
Patent Document 4: JP-A 2009-205924
Patent Document 5: WO 2017/002664
Patent Document 6: WO 2016/160338
Patent Document 7: JP-A 2015-166145
Patent Document 8: JP-A 2016-531358

SUMMARY OF INVENTION

Technical Problem

The present invention has been made in view of the circumstances mentioned above, and an object of the present invention is to provide a release layer-forming composition capable of providing a release layer that has high heat resistance and moderate releasability and is excellent in stability after film manufacturing.

Solution to Problem

The present inventors conducted extensive studies in order to achieve the object mentioned above, and have found out that a release layer-forming composition containing (A) a polyurea including a prescribed repeating unit, (B) an acid compound or a salt thereof, (C) a crosslinking agent selected from compounds having a nitrogen atom substituted with a hydroxyalkyl group and/or an alkoxymethyl group, (D) a polymeric additive including a prescribed repeating unit, and (E) a solvent can provide a release layer that has high heat resistance, excellent stickiness with a base body, and moderate stickiness and moderate releasability with a resin substrate, with good reproducibility; thus, have completed the present invention.

That is, the present invention provides a release layer-forming composition, and a release layer as defined below.
1. A release layer-forming composition, including:
   (A) a polyurea including a repeating unit represented by formula (1) below; (B) an acid compound or a salt thereof;
   (C) a crosslinking agent selected from compounds having a nitrogen atom substituted with a hydroxyalkyl group and/or an alkoxymethyl group;
   (D) a polymeric additive including a repeating unit represented by formula (a1) below, a repeating unit represented by formula (b) below, and a repeating unit represented by formula (c) below; and
   (E) a solvent, wherein the polymeric additive (D) is contained at 5 to 100 parts by weight per 100 parts by weight of the polyurea (A):

[Chem. 1]

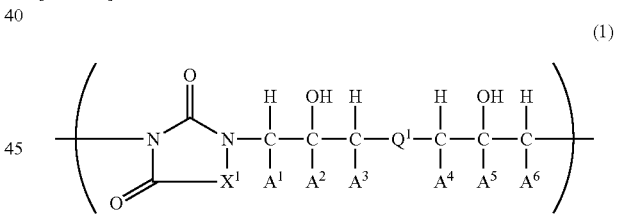

wherein $A^1$, $A^2$, $A^3$, $A^4$, $A^5$, and $A^6$ are each independently a hydrogen atom, a methyl group, or an ethyl group, and
$X^1$ is a group represented by formula (1-1), (1-2), (1-3), or (1-4) below,

[Chem. 2]

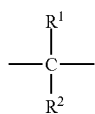

(1-1)

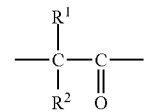

(1-2)

-continued

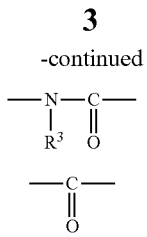
(1-3)

(1-4)

wherein $R^1$ and $R^2$ are each independently a hydrogen atom, an alkyl group having 1 to 6 carbon atoms, an alkenyl group having 3 to 6 carbon atoms, a benzyl group, or a phenyl group, the phenyl group may be substituted with at least one selected from the group consisting of an alkyl group having 1 to 6 carbon atoms, a halogen atom, an alkoxy group having 1 to 6 carbon atoms, a nitro group, a cyano group, a hydroxy group, and an alkylthio group having 1 to 6 carbon atoms, $R^1$ and $R^2$ may bond together to form a ring having 3 to 6 carbon atoms with the carbon atom to which $R^1$ and $R^2$ are bonded, $R^3$ is an alkyl group having 1 to 6 carbon atoms, an alkenyl group having 3 to 6 carbon atoms, a benzyl group, or a phenyl group, the phenyl group may be substituted with at least one selected from the group consisting of an alkyl group having 1 to 6 carbon atoms, a halogen atom, an alkoxy group having 1 to 6 carbon atoms, a nitro group, a cyano group, a hydroxy group, and an alkylthio group having 1 to 6 carbon atoms, and $Q^1$ is a group represented by formula (1-5) or (1-6) below,

[Chem. 3]

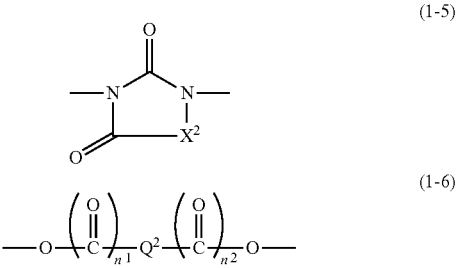
(1-5)

(1-6)

wherein $X^2$ is a group represented by formula (1-1), formula (1-2), or formula (1-4), $Q^2$ is an alkylene group having 1 to 10 carbon atoms, a phenylene group, a naphthylene group, or an anthrylene group, the phenylene group, the naphthylene group, and the anthrylene group may each be substituted with at least one selected from the group consisting of an alkyl group having 1 to 6 carbon atoms, a halogen atom, an alkoxy group having 1 to 6 carbon atoms, a nitro group, a cyano group, a hydroxy group, and an alkylthio group having 1 to 6 carbon atoms, and $n^1$ and $n^2$ are each independently 0 or 1,

[Chem. 4]

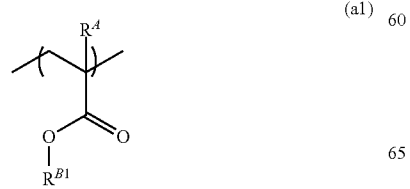
(a1)

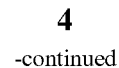
(b)

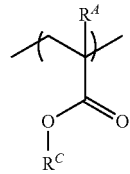

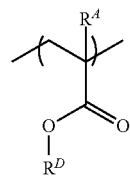
(c)

wherein $R^A$ is each independently a hydrogen atom or a methyl group, $R^{B1}$ is a branched alkyl group having 3 or 4 carbon atoms in which at least one hydrogen atom is substituted with a fluorine atom, $R^C$ is a hydroxyalkyl group having 1 to 10 carbon atoms, and $R^D$ is a polycyclic alkyl group having 6 to 20 carbon atoms or an aryl group having 6 to 12 carbon atoms.

2. The release layer-forming composition according to 1, wherein, in the repeating unit represented by formula (b) of the polymeric additive (D), $R^C$ is a hydroxyalkyl group having 2 to 10 carbon atoms, and the carbon atom to which the hydroxy group is bonded is a secondary or tertiary carbon atom.

3. The release layer-forming composition according to 1, wherein, in the repeating unit represented by formula (b) of the polymeric additive (D), $R^C$ is a hydroxyalkyl group having 1 to 10 carbon atoms, the carbon atom to which the hydroxy group is bonded is a primary carbon atom, and a content ratio of repeating units represented by formula (a1) is more than or equal to 25 mol % per all the repeating units of the polymeric additive (D).

4. The release layer-forming composition according to 1, wherein the polymeric additive (D) includes a repeating unit represented by formula (a2) below, a repeating unit represented by formula (b) below, a repeating unit represented by formula (c) below, and a repeating unit represented by formula (d) below:

[Chem. 5]

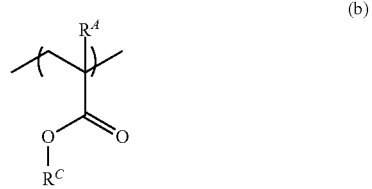
(a2)

(b)

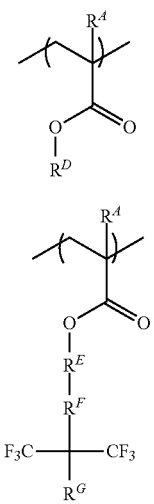

(c)

(d)

wherein $R^A$ is each independently a hydrogen atom or a methyl group, $R^{B2}$ is a branched alkyl group having 3 or 4 carbon atoms in which at least one hydrogen atom is substituted with a fluorine atom but that is exclusive of a 2-methyl-1,1,1,3,3,3-hexafluoroisopropyl group, $R^C$ is a hydroxyalkyl group having 1 to 10 carbon atoms, $R^D$ is a polycyclic alkyl group having 6 to 20 carbon atoms or an aryl group having 6 to 12 carbon atoms, $R^E$ is a single bond, a polycyclic alkylene group having 6 to 20 carbon atoms, or an arylene group having 6 to 12 carbon atoms, $R^F$ is a single bond or an alkylene group having 1 to 10 carbon atoms, and $R^G$ is a methyl group, an ethyl group, or a hydroxy group.

5. The release layer-forming composition according to any one of 1 to 4, wherein $X^1$ is a group represented by formula (1-3).
6. The release layer-forming composition according to 5, wherein $R^3$ is a 2-propenyl group.
7. The release layer-forming composition according to any one of 1 to 6, wherein $Q^1$ is a group represented by formula (1-5).
8. The release layer-forming composition according to any one of 1 to 7, wherein the component (B) is a sulfonic acid compound or a salt thereof.
9. The release layer-forming composition according to any one of 1 to 8, wherein the crosslinking agent (C) is a compound represented by any one of formulae (C-1) to (C-5) below:

[Chem. 6]

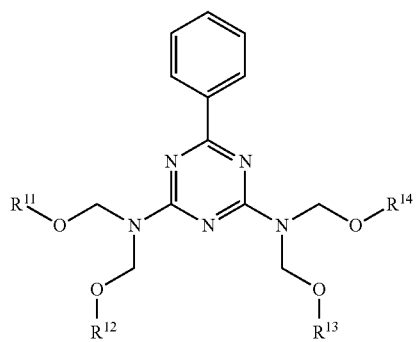

(C-1)

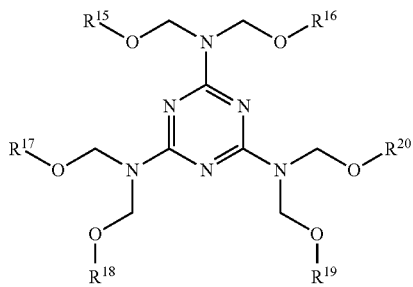

(C-2)

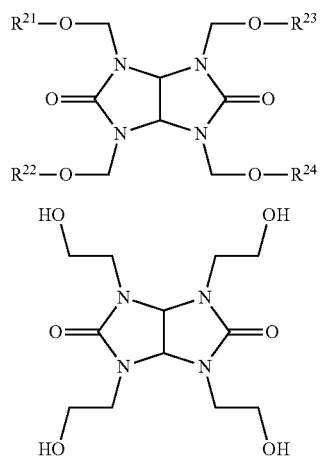

(C-3)

(C-4)

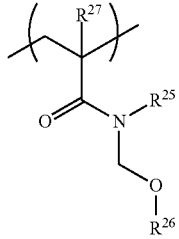

(C-5)

wherein $R^{11}$ to $R^{26}$ are each independently an alkyl group having 1 to 6 carbon atoms, and $R^{27}$ is a hydrogen atom or a methyl group.

10. The release layer-forming composition according to any one of 1 to 9, wherein the content amount of the crosslinking agent (C) is 10 to 100 parts by weight per 100 parts by weight of the polyurea (A).
11. A release layer obtained from the release layer-forming composition according to any one of 1 to 10.
12. A stacked body wherein a resin layer in which a light transmittance at a wavelength of 400 nm is more than or equal to 80% is stacked on the release layer according to 11.
13. A method for manufacturing a resin substrate, including:
   a step of applying the release layer-forming composition according to any one of 1 to 10 to a base body to form a release layer;
   a step of forming, on the release layer, a resin substrate in which a light transmittance at a wavelength of 400 nm is more than or equal to 80%; and
   a step of releasing the resin substrate by a release force of less than or equal to 0.25 N/25 mm.

Advantageous Effects of Invention

By using the release layer-forming composition of the present invention, a release layer having high heat resistance, excellent stickiness with a base body, and moderate stickiness and moderate releasability with a resin substrate can be obtained with good reproducibility. Further, in the manufacturing process of a flexible electronic device, a resin substrate formed on a base body can be separated together with a circuit etc. provided on the resin substrate from the base body without damaging the resin substrate or the circuit etc. Thus, the release layer-forming composition of the present invention can contribute to the speeding up of the manufacturing process, the improvement of the yield, etc. of a flexible electronic device including a resin substrate.

DESCRIPTION OF EMBODIMENTS

[Composition for Forming Release Layer]

A release layer-forming composition of the present invention is a composition containing (A) a polyurea including a prescribed repeating unit, (B) an acid compound or a salt thereof, (C) a crosslinking agent selected from compounds having a nitrogen atom substituted with a hydroxyalkyl group and/or an alkoxymethyl group, (D) a polymeric additive including a prescribed repeating unit, and (E) a solvent.

[(a) Polyurea]

The polyurea of the component (A) includes a repeating unit represented by formula (1) below.

[Chem. 7]

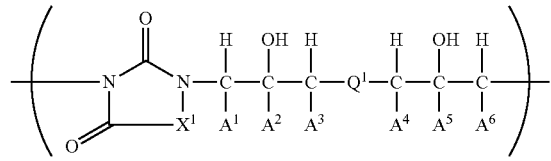

(1)

In formula (1), $A^1$, $A^2$, $A^3$, $A^4$, $A^5$, and $A^6$ are each independently a hydrogen atom, a methyl group, or an ethyl group; but from the viewpoints of releasability and productivity, it is preferable that all of $A^1$ to $A^6$ each be a hydrogen atom.

In formula (1), $X^1$ is a group represented by formula (1-1), (1-2), (1-3), or (1-4) below.

[Chem. 8]

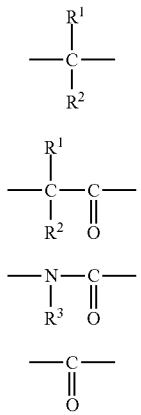

(1-1)

(1-2)

(1-3)

(1-4)

In formulae (1-1) and (1-2), $R^1$ and $R^2$ are each independently a hydrogen atom, an alkyl group having 1 to 6 carbon atoms, an alkenyl group having 3 to 6 carbon atoms, a benzyl group, or a phenyl group; the phenyl group may be substituted with at least one selected from the group consisting of an alkyl group having 1 to 6 carbon atoms, a halogen atom, an alkoxy group having 1 to 6 carbon atoms, a nitro group, a cyano group, a hydroxy group, and an alkylthio group having 1 to 6 carbon atoms; further, $R^1$ and $R^2$ may bond together to form a ring having 3 to 6 carbon atoms with the carbon atom to which $R^1$ and $R^2$ are bonded.

In formula (1-3), $R^3$ is an alkyl group having 1 to 6 carbon atoms, an alkenyl group having 3 to 6 carbon atoms, a benzyl group, or a phenyl group; the phenyl group may be substituted with at least one selected from the group consisting of an alkyl group having 1 to 6 carbon atoms, a halogen atom, an alkoxy group having 1 to 6 carbon atoms, a nitro group, a cyano group, a hydroxy group, and an alkylthio group having 1 to 6 carbon atoms.

In formula (1), $Q^1$ is a group represented by formula (1-5) or (1-6) below.

[Chem. 9]

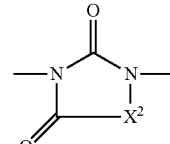

(1-5)

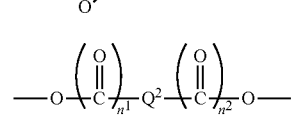

(1-6)

In formula (1-5), $X^2$ is a group represented by formula (1-1), formula (1-2), or formula (1-4). In formula (1-5), in the case where, for example, $X^2$ is a group represented by formula (1-2), the structure of formula (1-5) is formula (1-5-1).

[Chem. 10]

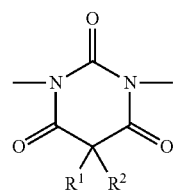

(1-5-1)

(In the formula, $R^1$ and $R^2$ are the same as above.)

In formula (1-6), $Q^2$ is an alkylene group having 1 to 10 carbon atoms, a phenylene group, a naphthylene group, or an anthrylene group. The phenylene group, the naphthylene group, and the anthrylene group may each be substituted with at least one selected from the group consisting of an alkyl group having 1 to 6 carbon atoms, a halogen atom, an alkoxy group having 1 to 6 carbon atoms, a nitro group, a cyano group, a hydroxy group, and an alkylthio group having 1 to 6 carbon atoms. In the case where $Q^2$ is a phenylene group, a naphthylene group, or an anthrylene group, the position of bonding of them is not particularly limited. That is, for example, there may be a case where a phenylene group is bonded at the 1-position and the 2-position, a case where a phenylene group is bonded at the 1-position and the 3-position, or a case where a phenylene group is bonded at the 1-position and the 4-position; a case where a naphthylene group is bonded at the 1-position and the 2-position, a case where a naphthylene group is bonded at the 1-position and the 4-position, a case where a naphthylene group is bonded at the 1-position and the 5-position, or a case where a naphthylene group is bonded at the 2-position and the 3-position; a case where an anthrylene group is bonded at the 1-position and the 2-position, a case where an anthrylene group is bonded at the 1-position and the 4-position, or a case where an anthrylene group is bonded at the 9-position and the 10-position, etc.; and any is possible.

The alkyl group having 1 to 6 carbon atoms may be straight, branched or cyclic, and examples include a methyl group, an ethyl group, an isopropyl group, a n-butyl group, a cyclohexyl group, and the like. The alkenyl group having 3 to 6 carbon atoms may be straight, branched or cyclic, and examples include a 2-propenyl group, a 3-butenyl group, and the like.

The alkoxy group having 1 to 6 carbon atoms may be straight, branched or cyclic, and examples include a methoxy group, an ethoxy group, an isopropoxy group, a n-pentyloxy group, a cyclohexyloxy group, and the like. The alkylthio group having 1 to 6 carbon atoms may be straight, branched or cyclic, and examples include a methylthio group, an ethylthio group, an isopropylthio group, a n-pentylthio group, a cyclohexylthio group, and the like. As the halogen atom, a fluorine atom, a chlorine atom, a bromine atom, an iodine atom, and the like are given. As the ring having 3 to 6 carbon atoms formed by $R^1$ and $R^2$ being bonded, a cyclobutane ring, a cyclopentane ring, a cyclohexane ring, and the like are given.

The alkylene group having 1 to 10 carbon atoms may be straight, branched or cyclic, and examples include a methylene group, an ethylene group, a propylene group, a pentamethylene group, a cyclohexylene group, a 2-methylpropylene group, and the like.

In formula (1), in the case where $X^1$ is a group represented by formula (1-2), the structure of formula (1) is one represented by formula (2) below; in the case where $X^1$ is a group represented by formula (1-3), the structure of formula (1) is one represented by formula (3) below. In formula (3), those in which $R^3$ is a 2-propenyl group are preferable.

[Chem. 11]

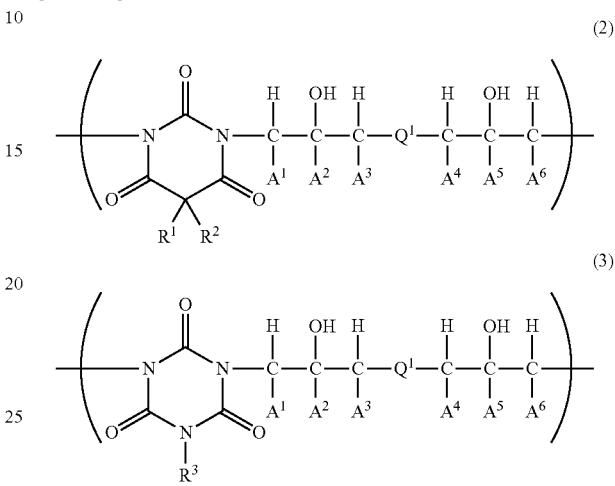

(In the formula, $A^1$ to $A^6$, $R^1$ to $R^3$, and $Q^1$ are the same as above.)

In formula (1), $Q^1$ preferably includes a cyclic structure from the viewpoint of the heat resistance of the polyurea of the component (A). That is, $Q^1$ is preferably a group represented by formula (1-5) or a group represented by formula (1-6) in which $Q^2$ is a cyclic alkylene group, a phenylene group, a naphthylene group, or an anthrylene group, and is more preferably a group represented by formula (1-5).

The repeating unit represented by formula (1) is preferably the repeating unit represented by any of formula (4) to formula (22) below. In the following formulae, Me is a methyl group, and Et is an ethyl group.

[Chem.12]

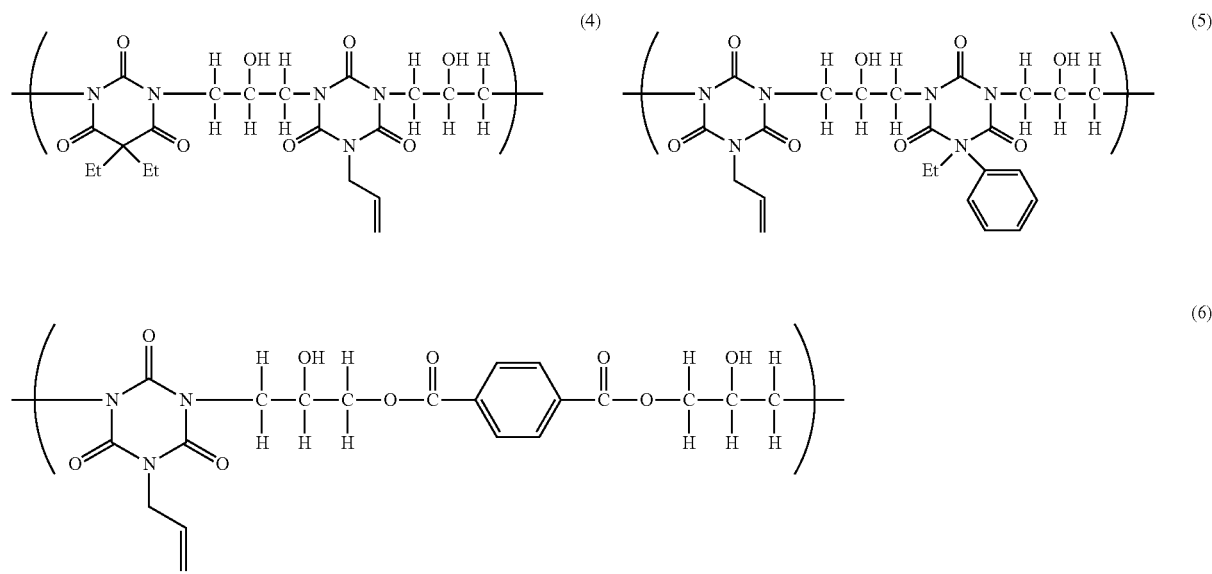

-continued
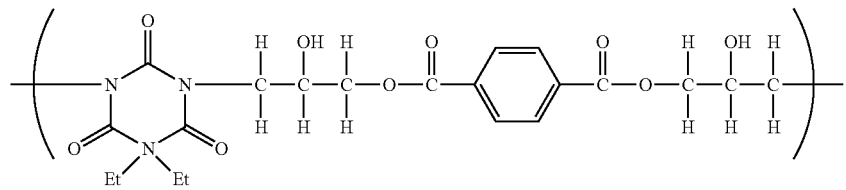
(7)
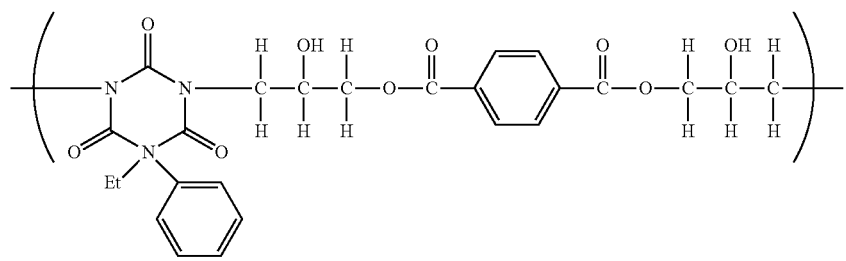
(8)
[Chem.13]
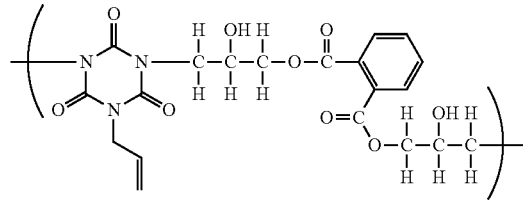
(9)
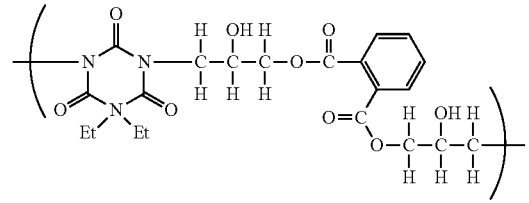
(10)
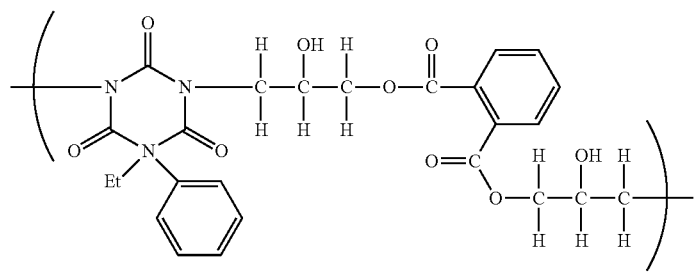
(11)
[Chem. 14]
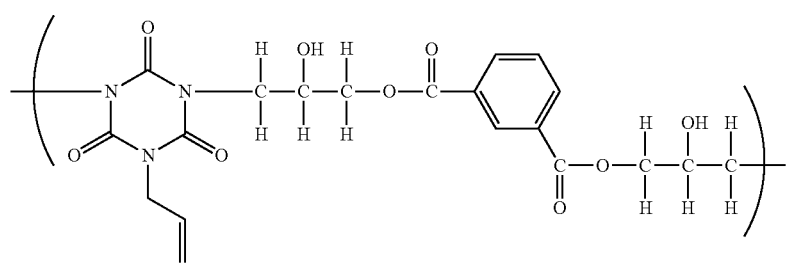
(12)
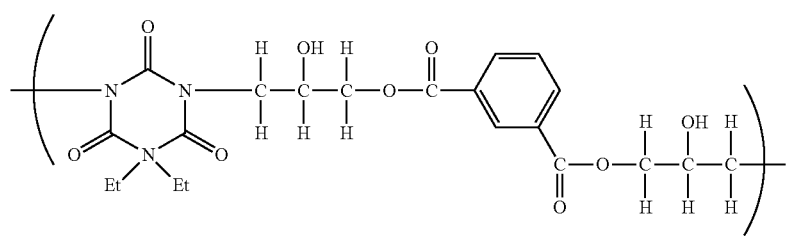
(13)

-continued
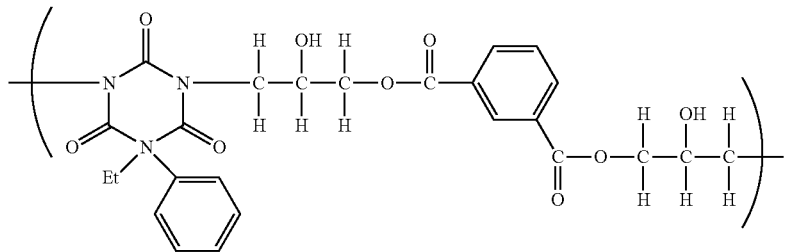
(14)
[Chem. 15]
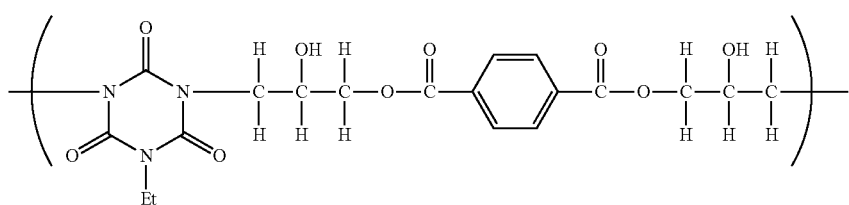
(15)
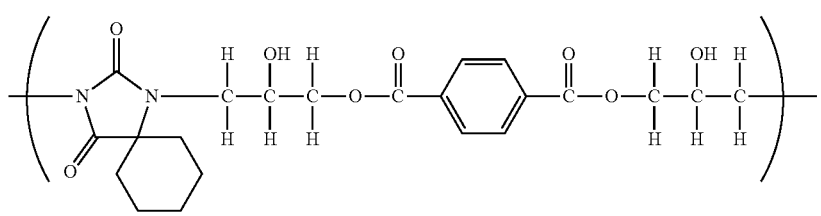
(16)
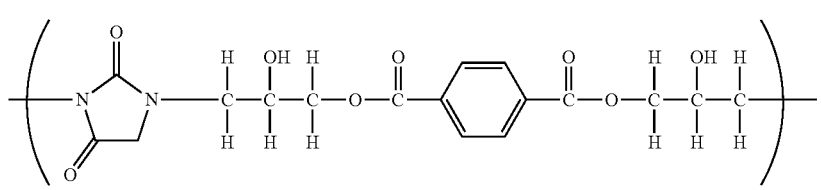
(17)
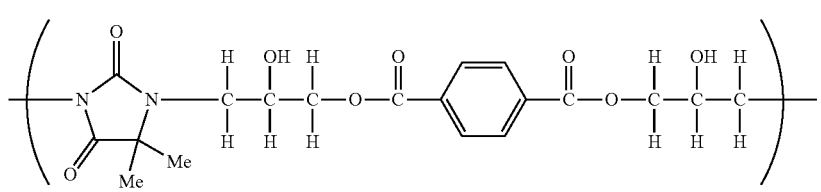
(18)
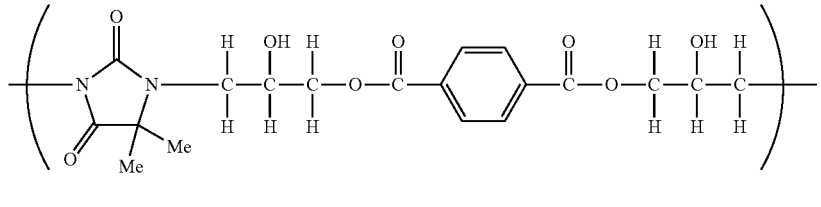
(19)
[Chem. 16]
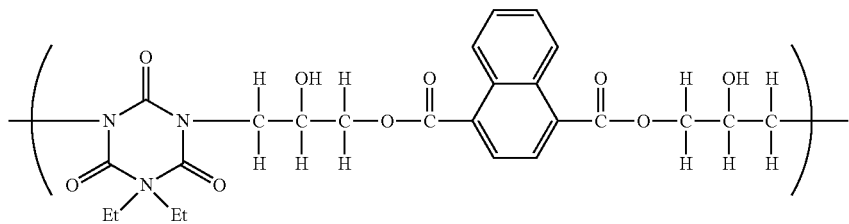
(20)
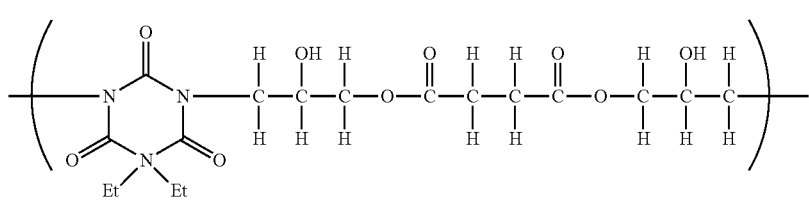

-continued

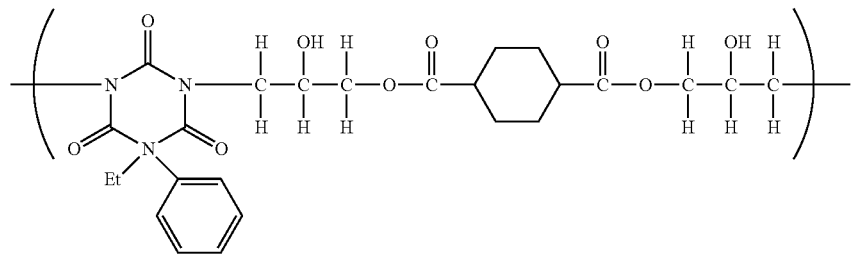

(21)

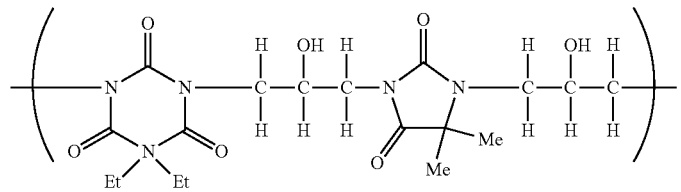

(22)

The polyurea of the component (A) can be synthesized with reference to WO 2005/098542, for example.

The weight-average molecular weight (Mw) of the polyurea (A) is preferably 1,000 to 200,000, more preferably 3,000 to 100,000, still more preferably 4,000 to 30,000, and yet still more preferably 5,000 to 20,000. The dispersion (Mw/Mn) of the polyurea (A) is preferably 1.3 to 4.0, and more preferably 1.4 to 2.5. Mn is the number-average molecular weight, and Mw and Mn are polystyrene-equivalent measurement values based on gel permeation chromatography (GPC).

[(B) Acid Compound or Salt Thereof]

The release layer-forming composition of the present invention contains an acid compound or a salt thereof as a component (B). As the acid compound, sulfonic acid compounds such as p-toluenesulfonic acid, trifluoromethanesulfonic acid, pyridinium p-toluenesulfonate, salicylic acid, camphorsulfonic acid, sulfosalicylic acid, 4-chlorobenzenesulfonic acid, 4-hydroxybenzenesulfonic acid, benzenedisulfonic acid, 1-naphthalenesulfonic acid, and pyridinium-1-naphthalenesulfonic acid, and carboxylic acid compounds such as salicylic acid, sulfosalicylic acid, citric acid, benzoic acid, and hydroxybenzoic acid are given. As the salt of the acid compound, a pyridinium salt, an isopropanolamine salt, an N-methylmorpholine salt, and the like of the acid are given; specifically, pyridinium p-toluenesulfonate, pyridinium 1-naphthalenesulfonate, isopropanolamine p-toluenesulfonate, N-methylmorpholine p-toluenesulfonate, and the like are given.

The content amount of the component (B) is preferably 0.01 to 15 parts by weight and more preferably 0.1 to 10 parts by weight per 100 parts by weight of the polyurea of the component (A). If the content amount of the component (B) is in the range mentioned above, a composition capable of providing a release layer that has high heat resistance and moderate releasability and is excellent in stability after film manufacturing is obtained. For (B) the acid compound or a salt thereof, one kind may be used singly, or two or more kinds may be used in combination.

[(C) Crosslinking agent]

The release layer-forming composition of the present invention contains a crosslinking agent as a component (C). The crosslinking agent is one selected from compounds having a nitrogen atom substituted with a hydroxyalkyl group and/or an alkoxymethyl group.

The crosslinking agent is preferably a compound represented by any of formulae (C-1) to (C-5) below.

[Chem. 17]

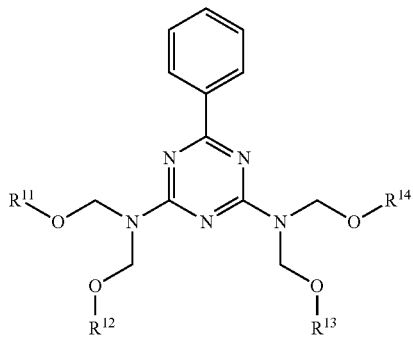

(C-1)

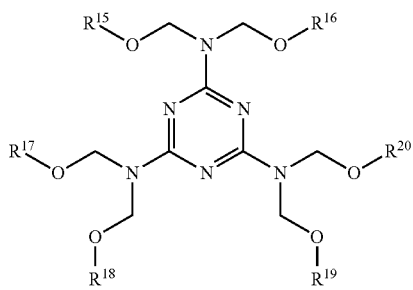

(C-2)

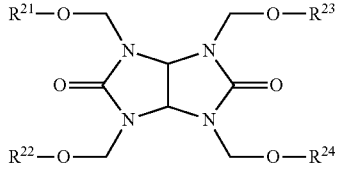

(C-3)

-continued

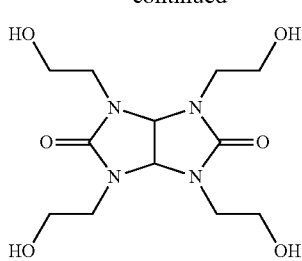

(C-4)

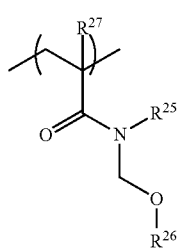

(C-5)

In the formulae, $R^{11}$ to $R^{26}$ are each independently a hydrogen atom or an alkyl group having 1 to 6 carbon atoms, and preferably an alkyl group having 1 to 6 carbon atoms.

$R^{27}$ is a hydrogen atom or a methyl group.

As the crosslinking agent, specifically, nitrogen-containing compounds such as hexamethylolmelamine, tetramethylolbenzoguanamine, 1,3,4,6-tetramethylolglycoluril, hexamethoxymethylmelamine, tetramethoxymethylbenzoguanamine, 1,3,4,6-tetrakis(methoxymethyl)glycoluril, 1,3,4,6-tetrakis(butoxymethyl)glycoluril, and 1,3,4,6-tetrakis(hydroxymethyl)glycoluril are given.

Further, commercially available nitrogen-containing compounds such as methoxymethyl-type melamine compounds (trade name: CYMEL (registered trademark) 300, CYMEL 301, CYMEL 303, and CYMEL 350), butoxymethyl-type melamine compounds (trade name: MY COAT (registered trademark) 506 and MY COAT 508), glycoluril compounds (trade name: CYMEL 1170 and POWDERLINK 1174), a methylated urea resin (trade name: UFR65), and butylated urea resins (trade name: UFR300, U-VAN10S60, U-VAN10R, and U-VAN11HV) manufactured by Allnex, and urea/formaldehyde-based resins (trade name: BECKAMINE (registered trademark) J-300S, BECKAMINE P-955, and BECKAMINE N) manufactured by DIC Corporation may be given.

Further, as the crosslinking agent, a polymer manufactured using a (meth)acrylamide compound substituted with a hydroxymethyl group or an alkoxymethyl group, such as N-hydroxymethyl(meth)acrylamide, N-methoxymethyl(meth)acrylamide, N-ethoxymethyl(meth)acrylamide, and N-butoxymethyl(meth)acrylamide, may be used. Examples of such a polymer include poly(N-butoxymethyl(meth)acrylamide), a copolymer of N-butoxymethyl(meth)acrylamide and styrene, a copolymer of N-hydroxymethyl(meth)acrylamide and methyl (meth)acrylate, a copolymer of N-ethoxymethylmethacrylamide and benzyl methacrylate, a copolymer of N-butoxymethyl(meth)acrylamide, benzyl (meth)acrylate, and 2-hydroxypropyl (meth)acrylate, and the like.

As the crosslinking agent, more preferably, hexamethoxymethylmelamine, tetramethoxymethylbenzoguanamine, 1,3,4,6-tetrakis(methoxymethyl)glycoluril (POWDERLINK 1174), 1,3,4,6-tetrakis(butoxymethyl)glycoluril, and 1,3,4,6-tetrakis(hydroxymethyl)glycoluril are given.

Each of these crosslinking agents can produce crosslinking reaction based on self-condensation. Further, each of these crosslinking agents can produce crosslinking reaction with a hydroxy group in a polyurea of the component (A). By such crosslinking reaction, the release layer formed is made strong, and is made to be a release layer with low solubility in organic solvents.

The content amount of the component (C) is preferably 10 to 100 parts by weight and more preferably 20 to 50 parts by weight per 100 parts by weight of the polyurea of the component (A). If the content amount of the component (C) is in the range mentioned above, a composition capable of providing a release layer that has high heat resistance and moderate releasability and is excellent in stability after film manufacturing is obtained. For the crosslinking agents (C), one kind may be used singly, or two or more kinds may be used in combination.

[(D) Polymeric Additive]

The release layer-forming composition of the present invention contains, as a component (D), a polymeric additive including a repeating unit represented by formula (a1) below, a repeating unit represented by formula (b) below, and a repeating unit represented by formula (c) below.

[Chem. 18]

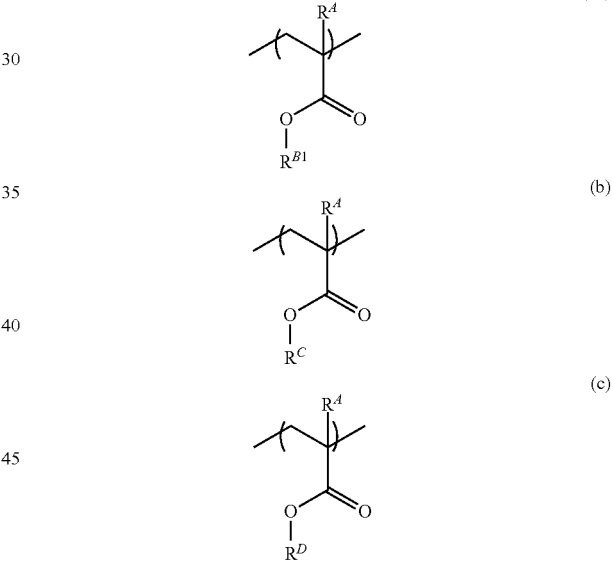

In the formula, $R^A$ is each independently a hydrogen atom or a methyl group. $R^{B1}$ is a branched alkyl group having 3 or 4 carbon atoms in which at least one hydrogen atom is substituted with a fluorine atom. $R^C$ is a hydroxyalkyl group having 1 to 10 carbon atoms. $R^D$ is a polycyclic alkyl group having 6 to 20 carbon atoms or an aryl group having 6 to 12 carbon atoms.

As the branched alkyl group having 3 or 4 carbon atoms, an isopropyl group, an isobutyl group, a sec-butyl group, and a tert-butyl group are given. $R^{B1}$ is preferably one in which at least one hydrogen atom of any of these branched alkyl groups is substituted with a fluorine atom, and specific examples include a 1,1,1-trifluoroisopropyl group, a 1,1,1,3,3,3-hexafluoroisopropyl group, a nonafluoro-tert-butyl group, and the like.

As the hydroxyalkyl group having 1 to 10 carbon atoms, a hydroxyalkyl group that has 2 to 10 carbon atoms and in which the carbon atom to which the hydroxy group is bonded is a primary carbon atom, such as a hydroxymethyl group, a 2-hydroxyethyl group, a 3-hydroxypropyl group, a 4-hydroxybutyl group, a 5-hydroxypentyl group, a 6-hydroxyhexyl group, a 7-hydroxyheptyl group, an 8-hydroxyoctyl group, a 9-hydroxynonyl group, a 10-hydroxydecyl group, a 2-hydroxy-1-methylethyl group, a 2-hydroxy-1,1-dimethylethyl group, a 3-hydroxy-1-methylpropyl group, a 3-hydroxy-2-methylpropyl group, a 3-hydroxy-1,1-dimethylpropyl group, a 3-hydroxy-1,2-dimethylpropyl group, a 3-hydroxy-2,2-dimethylpropyl group, a 4-hydroxy-1-methylbutyl group, a 4-hydroxy-2-methylbutyl group, and a 4-hydroxy-3-methylbutyl group; and a hydroxyalkyl group that has 1 to 10 carbon atoms and in which the carbon atom to which the hydroxy group is bonded is a secondary or tertiary carbon atom, such as a 1-hydroxyethyl group, a 1-hydroxypropyl group, a 2-hydroxypropyl group, a 1-hydroxybutyl group, a 2-hydroxybutyl group, a 1-hydroxyhexyl group, a 2-hydroxyhexyl group, a 1-hydroxyoctyl group, a 2-hydroxyoctyl group, a 1-hydroxydecyl group, a 2-hydroxydecyl group, a 1-hydroxy-1-methylethyl group, and a 2-hydroxy-2-methylpropyl group, are given.

As the polycyclic alkyl group having 6 to 20 carbon atoms, a 1-adamantyl group, a 2-adamantyl group, an isobornyl group, a norbornyl group, and the like are given. As the aryl group having 6 to 12 carbon atoms, a phenyl group, a 1-naphthyl group, a 2-naphthyl group, a 1-biphenylyl group, a 2-biphenylyl group, and the like are given.

Further, (D) a polymeric additive may be one including a repeating unit represented by formula (a2) below, a repeating unit represented by formula (b) below, a repeating unit represented by formula (c) below, and a repeating unit represented by formula (d) below.

[Chem. 19]

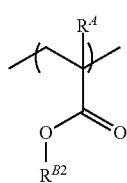
(a2)

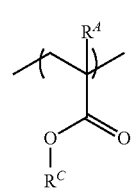
(b)

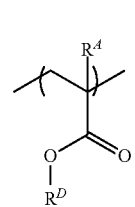
(c)

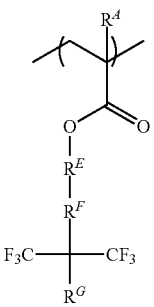
(d)

In the formulae, $R^A$, $R^C$, and $R^D$ are the same as above. $R^{B2}$ is a branched alkyl group that has 3 or 4 carbon atoms and in which at least one hydrogen atom is substituted with a fluorine atom (provided that a 2-methyl-1,1,1,3,3,3-hexafluoroisopropyl group is excluded). As the branched alkyl group having 3 or 4 carbon atoms, similar ones to those described above are given. $R^E$ is a single bond, a polycyclic alkylene group having 6 to 20 carbon atoms, or an arylene group having 6 to 12 carbon atoms. $R^F$ is a single bond or an alkylene group having 1 to 10 carbon atoms. $R^G$ is a methyl group, an ethyl group, or a hydroxy group.

As the polycyclic alkylene group having 6 to 20 carbon atoms, a group in which one hydrogen atom is removed from a specific example of the polycyclic alkyl group having 6 to 20 carbon atoms described above is given; for example, an adamantylene group, an isobornylene group, a norbornylene group, and the like are given.

As the arylene group having 6 to 12 carbon atoms, a group in which one hydrogen atom is removed from a specific example of the aryl group having 6 to 12 carbon atoms described above is given; for example, a phenylene group, a naphthylene group, a biphenylylene group, and the like are given.

As the alkylene group having 1 to 10 carbon atoms, similar ones to those given as examples in the description of $Q^2$ mentioned above may be given. In the present invention, an alkylene group having 1 to 5 carbon atoms is preferable, a methylene group and an ethylene group are more preferable, and a methylene group is still more preferable.

As the repeating unit represented by formula (a1) or (a2), those represented by formulae (a-1) to (a-3) below are given; but the repeating unit represented by formula (a1) or (a2) is not limited to these. In the following formulae, $R^A$ is the same as above.

[Chem. 20]

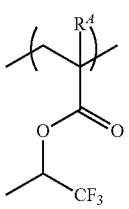
(a-1)

(a-2)
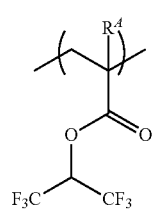
(a-3)
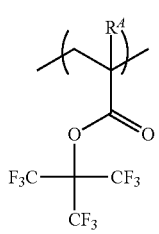
As the repeating unit represented by formula (b), those represented by formulae (b-1) to (b-16) below are given; but the repeating unit represented by formula (b) is not limited to these. In the following formulae, $R^A$ is the same as above.
[Chem. 21]
(b-1)
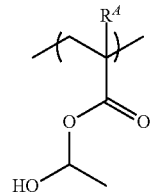
(b-2)
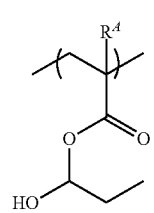
(b-3)
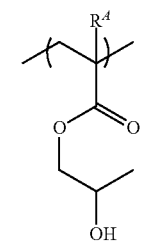
(b-4)
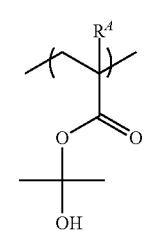
(b-5)
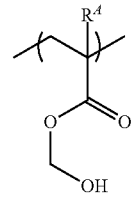
(b-6)
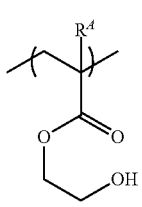
(b-7)
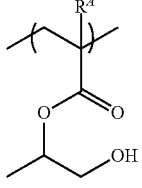
(b-8)
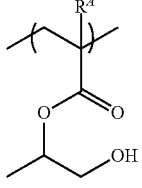
(b-9)
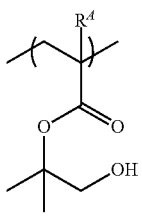
(b-10)
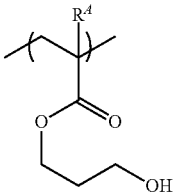
(b-11)
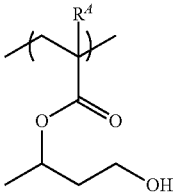

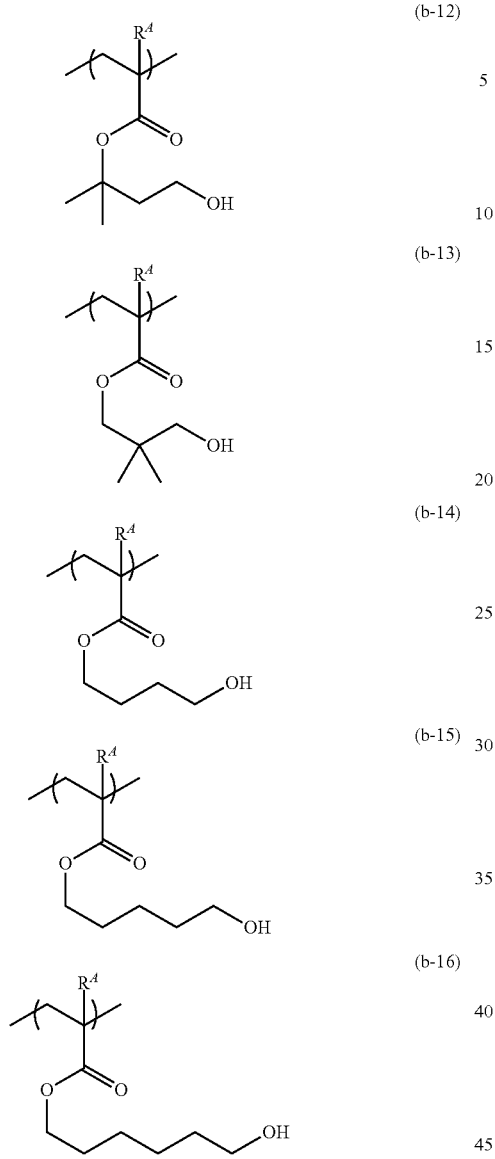
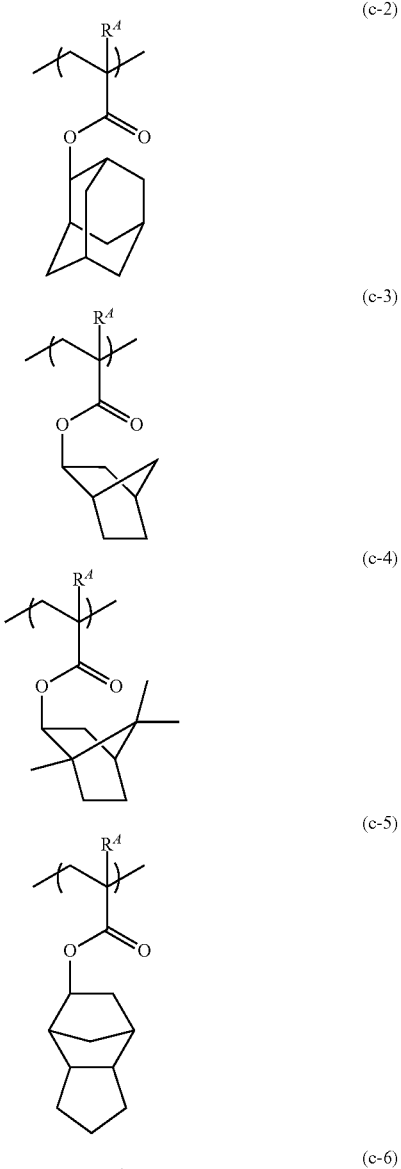
As the repeating unit represented by formula (c), those represented by formulae (c-1) to (c-13) below are given; but the repeating unit represented by formula (c) is not limited to these. In the following formulae, $R^A$ is the same as above.
[Chem. 22]

(c-8) 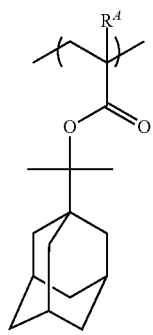
(c-9) 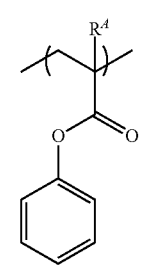
(c-10) 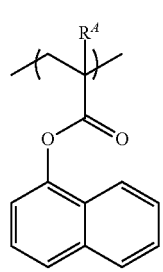
(c-11) 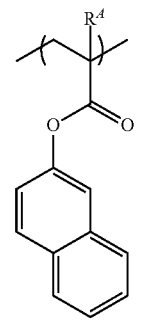
(c-12) 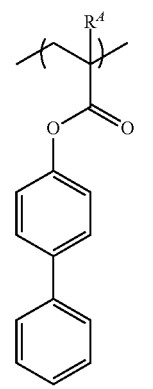
(c-13) 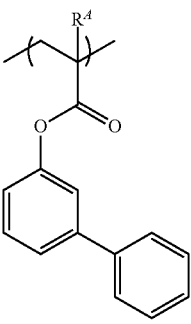
As the repeating unit represented by formula (d), those represented by formulae (d-1) to (d-8) below are given; but the repeating unit represented by formula (d) is not limited to these. In the following formulae, $R^A$ is the same as above.
[Chem. 23]
(d-1) 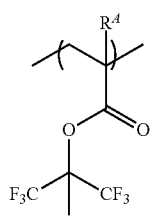
(d-2) 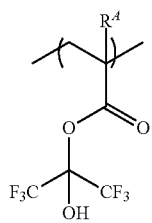
(d-3) 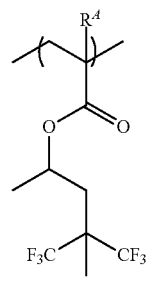
(d-4) 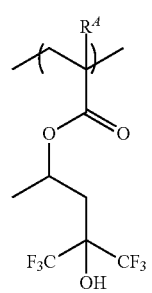

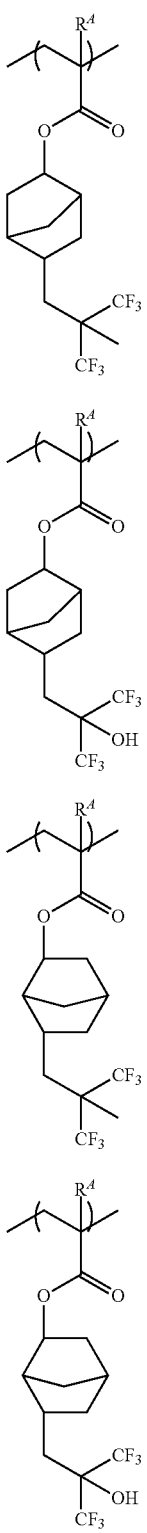

In the case where the polymeric additive (D) is one that includes a repeating unit represented by formula (a1), a repeating unit represented by formula (b), and a repeating unit represented by formula (c) and in which, in the hydroxyalkyl group in the repeating unit represented by formula (b), the carbon atom to which the hydroxy group is bonded is a secondary or tertiary carbon atom (hereinafter, such a polymeric additive is referred to as polymeric additive D1), the content ratio of repeating units represented by formula (a1) is preferably 30 to 60 mol % and more preferably 35 to 50 mol % per all the repeating units. The content ratio of repeating units represented by formula (b) is preferably 10 to 35 mol % and more preferably 15 to 30 mol % per all the repeating units. The content ratio of repeating units represented by formula (c) is preferably 5 to 60 mol % and more preferably 20 to 50 mol % per all the repeating units.

In the case where the polymeric additive (D) is one that includes a repeating unit represented by formula (a1), a repeating unit represented by formula (b), and a repeating unit represented by formula (c) and in which, in the hydroxyalkyl group in the repeating unit represented by formula (b), the carbon atom to which the hydroxy group is bonded is a primary carbon atom (hereinafter, such a polymeric additive is referred to as polymeric additive D2), the content ratio of repeating units represented by formula (a1) is preferably 15 to 60 mol %, more preferably 25 to 60 mol %, still more preferably 30 to 60 mol %, and yet still more preferably 35 to 50 mol % per all the repeating units. The content ratio of repeating units represented by formula (b) is preferably 8 to 38 mol %, preferably 10 to 38 mol %, more preferably 10 to 35 mol %, and still more preferably 15 to 30 mol % per all the repeating units. The content ratio of repeating units represented by formula (c) is preferably 2 to 77 mol %, more preferably 2 to 65 mol %, still more preferably 5 to 60 mol %, and yet still more preferably 20 to 50 mol % per all the repeating units.

In the case where the polymeric additive (D) is one including a repeating unit represented by formula (a2), a repeating unit represented by formula (b), a repeating unit represented by formula (c), and a repeating unit represented by formula (d) (hereinafter, such a polymeric additive is referred to as polymeric additive D3), the content ratio of repeating units represented by formula (a2) is preferably 2 to 45 mol % and more preferably 5 to 35 mol % per all the repeating units. The content ratio of repeating units represented by formula (b) is preferably 20 to 35 mol % and more preferably 25 to 35 mol % per all the repeating units. The content ratio of repeating units represented by formula (c) is preferably 30 to 45 mol % and more preferably 35 to 45 mol % per all the repeating units. The content ratio of repeating units represented by formula (d) is preferably 5 to 18 mol % and more preferably 5 to 15 mol % per all the repeating units.

The Mw of the polymeric additive (D) is preferably 2,000 to 10,000, and more preferably 3,000 to 6,000. Further, the Mw/Mn of (D) a polymeric additive is preferably 1.0 to 2.1, and more preferably 1.0 to 1.9.

The content amount of the polymeric additive of the component (D) is 5 to 100 parts by weight per 100 parts by weight of the polyurea of the component (A). If the content amount of the polymeric additive is less than 5 parts by weight, release force may be large; if the content amount of the polymeric additive is more than 100 parts by weight, repulsion may occur during film manufacturing.

Here, in the case where the polymeric additive (D) is polymeric additive D1, the content amount of the polymeric additive (D) is preferably 10 to 100 parts by weight, more preferably 20 to 100 parts by weight, and still more preferably 30 to 100 parts by weight per 100 parts by weight of the polyurea of the component (A). In the case where the polymeric additive (D) is one other than polymeric additive D1, the content amount of the polymeric additive (D) is preferably 5 to 80 parts by weight and more preferably 5 to 50 parts by weight per 100 parts by weight of the polyurea of the component (A).

For the polymeric additive (D), one kind may be used singly, or two or more kinds may be used in combination.

[(E) Solvent]

The release layer-forming composition of the present invention contains a solvent as a component (E). The solvent is preferably a glycol ether-based solvent having 3 to 20 carbon atoms, an ester-based solvent having 3 to 20 carbon atoms, a ketone-based solvent having 3 to 20 carbon atoms, or a cyclic compound-based solvent having 3 to 20 carbon atoms.

As the glycol ether-based solvent, propylene glycol monomethyl ether (PGME), propylene glycol monomethyl ether acetate (PGMEA), propylene glycol monoethyl ether, propylene glycol monopropyl ether, and the like are given.

As the ester-based solvent, ethyl lactate, y-butyrolactone, methyl 2-hydroxyisobutyrate, ethyl 2-hydroxyisobutyrate, and the like are given.

As the ketone-based solvent, methyl ethyl ketone, cyclohexanone, cyclopentanone, benzophenone, and the like are given.

As the cyclic compound solvent, N-methylpyrrolidone, y-butyrolactone, and the like are given.

The content amount of the solvent (E) is preferably an amount whereby the solid content concentration in the release layer-forming composition of the present invention is 0.1 to 40% by weight, more preferably an amount whereby the solid content concentration is 0.5 to 20% by weight, and still more preferably an amount whereby the solid content concentration is 0.5 to 10% by weight. The solid content is a general term of the components other than the solvent among all the components of the release layer-forming composition. For the solvent (E), one kind may be used singly, or two or more kinds may be used in mixture.

[Other Additional Substances]

The release layer-forming composition of the present invention may contain a surfactant, as necessary. The coatability of the release layer-forming composition on a substrate can be improved by adding a surfactant. As the surfactant, known surfactants such as nonionic-based surfactants, fluorine-based surfactants, and silicone-based surfactants may be used.

Specific examples of the nonionic-based surfactant include polyoxyethylene alkyl ethers such as polyoxyethylene lauryl ether, polyoxyethylene stearyl ether, polyoxyethylene cetyl ether, and polyoxyethylene oleyl ether; polyoxyethylene alkylaryl ethers such as polyoxyethylene octylphenyl ether and polyoxyethylene nonylphenyl ether; polyoxyethylene-polyoxypropylene block copolymers; sorbitan fatty acid esters such as sorbitan monolaurate, sorbitan monopalmitate, sorbitan monostearate, sorbitan monooleate, sorbitan trioleate, and sorbitan tristearate; polyoxyethylene sorbitan fatty acid esters such as polyoxyethylene sorbitan monolaurate, polyoxyethylene sorbitan monopalmitate, polyoxyethylene sorbitan monostearate, polyoxyethylene sorbitan trioleate, and polyoxyethylene sorbitan tristearate, and the like.

As the fluorine-based surfactant or the like, EFTOP (registered trademark) EF301, EF303, and EF352 (manufactured by Mitsubishi Materials Electronic Chemicals Co., Ltd.), MEGAFAC (registered trademark) F171, F173, F554, F559, F563, R-30, R-40, R-40-LM, and DS-21 (manufactured by DIC Corporation), FLUORAD (registered trademark) FC430 and FC431 (manufactured by 3M Company), AsahiGuard (registered trademark) AG710 and Surflon (registered trademark) S-382, SC101, SC102, SC103, SC104, SC105, and SC 106 (manufactured by Asahi Glass Co., Ltd.), and the like are given.

As the silicone-based surfactant, an organosiloxane polymer KP341 (manufactured by Shin-Etsu Chemical Co., Ltd.) and the like are given.

In the case where the release layer-forming composition contains a surfactant, the content amount of the surfactant is preferably 0.0001 to 1 part by weight and more preferably 0.001 to 0.5 parts by weight per 100 parts by weight of the polyurea (A). For the surfactant, one kind may be used singly, or two or more kinds may be used in combination.

[Preparation of Composition for Forming Release Layer]

The method for preparing the release layer-forming composition of the present invention is not particularly limited. Examples of the preparation method include a method in which the component (B), the component (C), the component (D), the component (E), etc. are mixed at a prescribed ratio in a solution of the component (A) dissolved in a solvent and a homogeneous solution is obtained, and a method in which, as necessary, another additive is further added and mixed in a proper stage of the preparation method mentioned above.

In the preparation of the release layer-forming composition of the present invention, a solution of a specified copolymer (polymer) obtained by polymerization reaction in a solvent may be used as it is. In this case, for example, the component (B), and further the component (C), the component (D), the component (E), etc. are put into a solution of the component (A), and a homogeneous solution is obtained, similarly to the above. At this time, a solvent may be further added for the purpose of concentration adjustment. At this time, the solvent used in the generation process of the component (A) and the solvent used for the concentration adjustment of the release layer-forming composition may be the same, or may be different.

The prepared solution of the release layer-forming composition is preferably used after filtration using a filter with a pore size of approximately 0.2 m or the like.

The viscosity of the release layer-forming composition of the present invention is set in view of the thickness of the release layer to be produced, etc., as appropriate; in particular, in the case where the aim is to obtain a film with a thickness of approximately 0.01 to 5 m with good reproducibility, the viscosity is usually approximately 1 to 5,000 mPa·s and preferably approximately 1 to 2,000 mPa·s at 25° C.

Here, the viscosity can be measured using a commercially available viscometer for measurement of the viscosity of liquid with reference to, for example, a procedure described in JIS K7117-2, under the condition of a temperature of the composition of 25° C. The viscosity can be measured preferably using a cone flat plate-type (cone plate-type) rotational viscometer as the viscometer, preferably using 1°34'×R24 as a standard cone rotor in the same type of viscometer, under the condition of a temperature of the composition of 25° C. Examples of such a rotational viscometer include TVE-25L manufactured by Toki Sangyo Co., Ltd.

[Release Layer]

A release layer having excellent stickiness with a base body and moderate stickiness and moderate releasability with a resin substrate can be obtained by a firing method including a step of applying the release layer-forming composition of the present invention on a base body and then performing firing at 180 to 250° C.

The heating time cannot be prescribed unconditionally, because it varies with the heating temperature, but is usually 1 minute to 5 hours. The temperature at the time of the firing may include a step of performing firing at a temperature less than or equal to the range mentioned above as long as the highest temperature is in the range mentioned above.

As a preferred example of the heating manner in the present invention, a manner in which heating is performed at 50 to 150° C. for 1 minute to 1 hour, then the heating temperature is raised in the same state, and heating is performed at 180 to 250° C. for 5 minutes to 4 hours is given. In particular, as a more preferred example of the heating manner, a manner in which heating is performed at 50 to 150° C. for 1 minute to 1 hour and heating is performed at 200 to 250° C. for 5 minutes to 2 hours is given. Further, as another more preferred example of the heating manner, a manner in which heating is performed at 50 to 150° C. for 1 to 30 minutes and then heating is performed at 200 to 250° C. for 5 minutes to 1 hour is given.

In the case where the release layer of the present invention is formed on a base body, the release layer may be formed on a partial surface of the base body, or may be formed on the entire surface. Manners of forming the release layer on a partial surface of the base body include a manner in which the release layer is formed only on a prescribed area of the surface of the base body, a manner in which the release layer is formed in a pattern configuration such as a dot pattern or a line-and-space pattern on the entire surface of the base body, etc. In the present invention, the base body means a body on a surface of which the release layer-forming composition of the present invention is applied and that is used for the manufacturing of a flexible electronic device or the like.

As the base body (substrate), for example, glass, a metal (a silicon wafer or the like), a slate, and the like are given; in particular, glass is preferable because a release layer obtained from the release layer-forming composition of the present invention has sufficient stickiness to glass. The surface of the base body may be formed of a single material, or may be formed of two or more materials. Manners of forming the surface of the base body out of two or more materials include a manner in which an area of the surface of the base body is formed of a material and the other area of the surface is formed of another material, a manner in which a material exists in a pattern configuration such as a dot pattern or a line-and-space pattern in another material on the entire surface of the base body, etc.

The application method is not particularly limited, and examples include the cast coating method, the spin coating method, the blade coating method, the dip coating method, the roll coating method, the bar coating method, the die coating method, the inkjet method, the printing method (letterpress, intaglio, planographic, and screen printing, and the like), etc.

Examples of tools used for heating include a hot plate, an oven, and the like. The heating atmosphere may be air or an inert gas, and may be under normal pressure or reduced pressure.

The thickness of the release layer is usually approximately 0.01 to 50 μm; from the viewpoint of productivity, the thickness of the release layer is preferably approximately 0.01 to 20 μm, and more preferably approximately 0.01 to 5 μm; a desired thickness is obtained by adjusting the thickness of the coating film before heating.

The release layer of the present invention has excellent stickiness with a base body, particularly a base body of glass, and moderate stickiness and moderate releasability with a resin substrate. Thus, in the manufacturing process of a flexible electronic device, the release layer of the present invention can be suitably used to release a resin substrate of the device, together with a circuit etc. formed on the resin substrate, from a base body without damaging the resin substrate.

[Method for Manufacturing Resin Substrate]

An example of a method for manufacturing a flexible electronic device using a release layer of the present invention is described. First, the release layer-forming composition of the present invention is used to form a release layer on a glass base body by the method described above. A resin substrate-forming solution for forming a resin substrate is applied on the release layer, and the resulting coating film is fired; thus, a resin substrate fixed to the glass base body via the release layer of the present invention is formed.

The firing temperature of the coating film is set in accordance with the kind of the resin, etc., as appropriate; in the present invention, the highest temperature at the time of the firing is set to preferably 200 to 250° C., more preferably 210 to 250° C., and still more preferably 220 to 240° C. Stickiness between the release layer, which is the underlayer, and the base body, and moderate stickiness and releasability between the release layer and the resin substrate can be improved more by setting, in the range mentioned above, the highest temperature at the time of firing during the production of the resin substrate. Also in this case, a step of performing firing at a temperature less than or equal to the range mentioned above may be included as long as the highest temperature is in the range mentioned above.

The resin substrate is formed with an area larger than the area of the release layer so as to cover the entire release layer. As the resin substrate, a resin substrate made of an acrylic polymer and a resin substrate made of a cycloolefin polymer are given. The method for forming the resin substrate may follow a usual method. The resin substrate is preferably one in which the light transmittance at a wavelength of 400 nm is more than or equal to 80%.

Next, as necessary, a desired circuit is formed on the resin substrate fixed to the base body via the release layer of the present invention; then, for example, the resin substrate is cut along the release layer, and the resin substrate is released together with the circuit from the release layer; thus, the resin substrate and the base body are separated. At this time, part of the base body may be cut together with the release layer. If the release layer of the present invention is used, the resin substrate can be released from the release layer by a release force of less than or equal to 0.25 N/25 mm. In particular, in the case where (D) a polymeric additional substance is polymeric additive D2 or polymeric additive D3, the resin substrate can be released from the release layer by a release force of less than or equal to 0.15 N/25 mm. Further, in the case where (D) a polymeric additional substance is polymeric additive D1, the resin substrate can be released from the release layer by a release force of less than or equal to 0.1 N/25 mm.

EXAMPLES

Hereinbelow, the present invention is described in more detail by using Synthesis Examples, Preparation Examples, Examples, and Comparative Examples; but the present invention is not limited to the Examples described below.

Compounds used in the following examples are as follows.

PGME: Propylene glycol monomethyl ether
PGMEA: Propylene glycol monomethyl ether acetate PL-LI: 1,3,4,6-Tetrakis(methoxyethyl)glycoluril (manufactured by Allnex; trade name: POWDERLINK 1174)
PPTS: Pyridinium p-toluenesulfonate
HPMA: 2-Hydroxypropyl methacrylate
HEMA: 2-Hydroxyethyl methacrylate
ADMA: 2-Adamantyl methacrylate
IBXA: Isobornyl methacrylate
CHMI: Cyclohexylmaleimide
HFiPMA: 1,1,1,3,3,3-Hexafluoroisopropyl methacrylate
HFiPAA: 1,1,1,3,3,3-Hexafluoroisopropyl acrylate
PFHMA: 2-(Perfluorohexyl)ethyl methacrylate
KBM-503: 3-Methacryloxypropyltriethoxysilane
MA-BTHB-OH: 4,4,4-Trifluoro-3-hydroxy-1-methyl-3-(trifluoromethyl)butyl methacrylate
MA-BTHB-NB: 5-[3,3,3-Trifluoro-2-hydroxy-2-(trifluoromethyl)propyl]bicyclo[2.2.1]-heptane-2-yl methacrylate
HFTB-M: 2-Methyl-1,1,1,3,3,3-hexafluoroisopropyl methacrylate
BMI70: Bis(3-ethyl-5-methyl-4-maleimidephenyl)methane
AIBN: Azobisisobutyronitrile The measurement of the weight-average molecular weight (Mw) of the polymer was performed using a GPC apparatus manufactured by JASCO Corporation (column: Shodex (registered trademark) KD801 and KD805 (manufactured by Showa Denko K.K.); eluent: dimethylformamide/LiBr.H$_2$O (29.6 mM)/H$_3$PO$_4$ (29.6 mM)/THF (0.1% by weight); flow rate: 1.0 mL/minute; column temperature: 40° C.; Mw: a standard polystyrene-equivalent value).

[1] Synthesis of Polymer

[Synthesis Example 1] Synthesis of Polyurea (L1)

100 g of monoallyl diglycidyl isocyanurate (manufactured by Shikoku Chemicals Corporation), 66.4 g of 5,5-diethylbarbituric acid, and 4.1 g of benzyltriethylammonium chloride were dissolved in 682 g of PGME, then reaction was performed at 130° C. for 24 hours, and a solution containing a polyurea (L1) (the solid content concentration: 20% by weight) was obtained. As a result of GPC analysis, the Mw of the obtained polyurea (L1) was found to be 8,000, and the Mw/Mn to be 1.5.

[Synthesis Example 2] Synthesis of Acrylic Polymer (S1)

2.82 g of HFiPAA, 0.79 g of HPMA, 4.00 g of ADMA, and 0.30 g of AIBN were dissolved in 33.1 g of PGME, reaction was performed at 70° C. for 20 hours, and an acrylic polymer (S1) solution (the solid content concentration: 20% by weight) was obtained. The composition ratio of the units was HFiPAA:HPMA:ADMA=20:30:50. As a result of GPC analysis, the Mw of the obtained acrylic polymer (S1) was found to be 4,450, and the Mw/Mn to be 1.8.

[Synthesis Example 3] Synthesis of Acrylic Polymer (S2)

3.62 g of HFiPMA, 0.74 g of HPMA, 3.00 g of ADMA, and 0.28 g of AIBN were dissolved in 31.9 g of PGME, reaction was performed at 70° C. for 20 hours, and an acrylic polymer (S2) solution (the solid content concentration: 20% by weight) was obtained. The composition ratio of the units was HFiPMA:HPMA:ADMA=45:15:40. As a result of GPC analysis, the Mw of the obtained acrylic polymer (S2) was found to be 4,470, and the Mw/Mn to be 1.8.

[Synthesis Example 4] Synthesis of Acrylic Polymer (S3)

3.54 g of HFiPMA, 1.62 g of HPMA, 2.50 g of IBXA, and 0.31 g of AIBN were dissolved in 33.4 g of PGME, reaction was performed at 70° C. for 20 hours, and an acrylic polymer (S3) solution (the solid content concentration: 20% by weight) was obtained. The composition ratio of the units was HFiPMA:HPMA:IBXA=40:30:30. As a result of GPC analysis, the Mw of the obtained acrylic polymer (S3) was found to be 4,200, and the Mw/Mn to be 1.8.

[Synthesis Example 5] Synthesis of Acrylic Polymer (CS1)

3.51 g of HFiPMA, 1.61 g of HPMA, 2.00 g of CHMI, and 0.30 g of AIBN were dissolved in 31.2 g of PGME, reaction was performed at 70° C. for 20 hours, and an acrylic polymer (CS1) solution (the solid content concentration: 20% by weight) was obtained. The composition ratio of the units was HFiPMA:HPMA:CHMI=30:40:30. As a result of GPC analysis, the Mw of the obtained acrylic polymer (CS 1) was found to be 3,600, and the Mw/Mn to be 2.0.

[Synthesis Example 6] Synthesis of Acrylic Polymer (CS2)

5.00 g of PFHMA, 3.83 g of KBM-503, 1.51 g of HEMA, and 0.52 g of AIBN were dissolved in 41.36 g of PGME, reaction was performed at 70° C. for 20 hours, and an acrylic polymer (CS2) solution (the solid content concentration: 20% by weight) was obtained. The composition ratio of the units was PFHMA:KBM-503:HEMA=30:40:30. The Mw of the obtained acrylic polymer (CS2) was found to be 6,700, and the Mw/Mn to be 1.4.

[Synthesis Example 7] Synthesis of Acrylic Polymer (S1')

4.02 g of HFiPMA, 2.22 g of HEMA, 5.00 g of ADMA, and 0.47 g of AIBN were dissolved in 49.1 g of PGME, reaction was performed at 70° C. for 20 hours, and an acrylic polymer (S1') solution (the solid content concentration: 20% by weight) was obtained. The composition ratio of the units was HFiPMA:HEMA:ADMA=30:30:40. As a result of GPC analysis, the Mw of the obtained acrylic polymer (S1') was found to be 5,040, and the Mw/Mn to be 1.7.

[Synthesis Example 8] Synthesis of Acrylic Polymer (S2')

3.98 g of HFiPMA, 2.20 g of HEMA, 5.00 g of IBXA, and 0.46 g of ATBN were dissolved in 48.8 g of PGME, reaction was performed at 70° C. for 20 hours, and an acrylic polymer (S2') solution (the solid content concentration: 20% by weight) was obtained. The composition ratio of the units was HFiPMA:HEMA:IBXA=30:30:40. As a result of GPC analysis, the Mw of the obtained acrylic polymer (S2') was found to be 4,850, and the Mw/Mn to be 1.7.

[Synthesis Example 9] Synthesis of Acrylic Polymer (S3')

1.72 g of HFiPMA, 1.42 g of HEMA, 4.00 g of ADMA, and 0.30 g of AIBN were dissolved in 31.2 g of PGME, reaction was performed at 70° C. for 20 hours, and an acrylic polymer (S3') solution (the solid content concentration: 20% by weight) was obtained. The composition ratio of the units was HFiPMA:HEMA:ADMA=20:30:50. As a result of GPC analysis, the Mw of the obtained acrylic polymer (S3') was found to be 4,350, and the Mw/Mn to be 1.7.

[Synthesis Example 10] Synthesis of Acrylic Polymer (S4')

2.80 g of HFiPMA, 2.21 g of HEMA, 5.00 g of ADMA, and 0.42 g of AIBN were dissolved in 43.9 g of PGME, reaction was performed at 70° C. for 20 hours, and an acrylic polymer (S4') solution (the solid content concentration: 20% by weight) was obtained. The composition ratio of the units was HFiPMA:HEMA:ADMA=23:33:44. As a result of GPC analysis, the Mw of the obtained acrylic polymer (S4') was found to be 4,680, and the Mw/Mn to be 1.7.

[Synthesis Example 11] Synthesis of Acrylic Polymer (S1")

1.61 g of HFiPMA, 1.33 g of HEMA, 3.00 g of ADMA, 1.00 g of MA-BTHB-OH, and 0.28 g of AIBN were dissolved in 30.2 g of PGME, reaction was performed at 70° C. for 20 hours, and an acrylic polymer (S1") solution (the solid content concentration: 20% by weight) was obtained. The composition ratio of the units was HFiPMA:HEMA:ADMA:MA-BTHB-OH=20:30:40:10. As a result of GPC analysis, the Mw of the obtained acrylic polymer (S1") was found to be 4,920, and the Mw/Mn to be 1.4.

[Synthesis Example 12] Synthesis of Acrylic Polymer (S2")

1.61 g of HFiPMA, 1.33 g of HEMA, 3.00 g of ADMA, 1.23 g of MA-BTHB-NB, and 0.28 g of AIBN were dissolved in 31.1 g of PGME, reaction was performed at 70° C. for 20 hours, and an acrylic polymer (S2") solution (the solid content concentration: 20% by weight) was obtained. The composition ratio of the units was HFiPMA:HEMA:ADMA:MA-BTHB-NB=20:30:40:10. As a result of GPC analysis, the Mw of the obtained acrylic polymer (S2") was found to be 5,630, and the Mw/Mn to be 1.5.

[Synthesis Example 13] Synthesis of Acrylic Polymer (S3")

1.61 g of HFiPMA, 1.33 g of HEMA, 3.00 g of ADMA, 0.85 g of HFTB-M, and 0.28 g of AIBN were dissolved in 29.6 g of PGME, reaction was performed at 70° C. for 20 hours, and an acrylic polymer (S3") solution (the solid content concentration: 20% by weight) was obtained. The composition ratio of the units was HFiPMA:HEMA:ADMA:HFTB-M=20:30:40:10. As a result of GPC analysis, the Mw of the obtained acrylic polymer (S3") was found to be 5,160, and the Mw/Mn to be 1.5.

[2] Preparation of Composition for Forming Resin Substrate

[Preparation Example 1] Preparation of Composition for Forming a Resin Substrate F1

10 g of ZEONOR (registered trademark) 1020R (a cycloolefin polymer manufactured by Zeon Corporation) and 3 g of Epolead (registered trademark) GT401 (manufactured by Daicel Corporation) were added to an eggplant flask in which 100 g of carbon tetrachloride was put. The solution was stirred for dissolution for 24 hours in a nitrogen atmosphere, and a composition for forming a resin substrate F, 1 was prepared.

[Preparation Example 2] Preparation of Composition for Forming Resin Substrate F2

10 g of ZEONOR (registered trademark) 1060R (a cycloolefin polymer manufactured by Zeon Corporation) was added to an eggplant flask in which 100 g of carbon tetrachloride was put. The solution was stirred for dissolution for 24 hours in a nitrogen atmosphere, and a composition for forming a resin substrate F2 was prepared.

[3] Preparation of Composition for Forming Release Layer-1

[Example 1-1] Preparation of Release Layer-Forming Composition A1

0.04 g of PL-LI, 0.01 g of PPTS, 0.05 g of the acrylic polymer (S1) solution, and PGMEA were added to 1 g of the reaction liquid obtained in Synthesis Example 1, and dilution was performed with PGME such that the solid content concentration became 1% by weight and the concentration of PGMEA became 30% by weight; thus, a release layer-forming composition A1 was prepared.

[Example 1-2] Preparation of Release Layer-Forming Composition A2

A release layer-forming composition A2 was prepared by a similar method to Example 1-1 except that the acrylic polymer (S2) solution was used in place of the acrylic polymer (S1) solution.

[Example 1-3] Preparation of Release Layer-Forming Composition A3

A release layer-forming composition A3 was prepared by a similar method to Example 1-1 except that the acrylic polymer (S3) solution was used in place of the acrylic polymer (S1) solution.

[Example 1-4] Preparation of Release Layer-Forming Composition A4

0.04 g of PL-LI, 0.01 g of PPTS, 0.10 g of the acrylic polymer (S1) solution, and PGMEA were added to 1 g of the reaction liquid obtained in Synthesis Example 1, and dilution was performed with PGME such that the solid content concentration became 1% by weight and the concentration of PGMEA became 30% by weight; thus, a release layer-forming composition A4 was prepared.

[Comparative Example 1-1] Preparation of Release Layer-Forming Composition A5

A release layer-forming composition A5 was prepared by a similar method to Example 1-1 except that the acrylic polymer (CS1) solution was used in place of the acrylic polymer (S1) solution.

[Comparative Example 1-2] Preparation of Release Layer-Forming Composition A6

A release layer-forming composition A6 was prepared by a similar method to Example 1-1 except that 0.002 g of the acrylic polymer (CS2) solution was used in place of the acrylic polymer (S 1) solution.

[Comparative Example 1-3] Preparation of Release Layer-Forming Composition A7

PGMEA was added to 5.0 g of a phenol novolac resin TD2131 (manufactured by DIC Corporation) and 1.0 g of BMI70, and dilution was performed with PGME such that the solid content concentration became 5% by weight and the concentration of PGMEA became 30% by weight; thus, a release layer-forming composition A7 was prepared.

[Comparative Example 1-4] Preparation of Release Layer-Forming Composition A8

0.04 g of PL-LI, 0.01 g of paratoluenesulfonic acid, 1.06 g of a non-fluorine-based acrylic polymer UC-3000 (manufactured by Toagosei Co., Ltd.), and PGMEA were added to 1 g of the reaction liquid obtained in Synthesis Example L1, and dilution was performed with PGME such that the solid content concentration became 4% by weight and the concentration of PGMEA became 30% by weight; thus, a release layer-forming composition A8 was prepared.

[Comparative Example 1-5] Preparation of Release Layer-Forming Composition A9

0.04 g of PL-LI, 0.01 g of paratoluenesulfonic acid, 1.06 g of a non-fluorine-based acrylic polymer UC-3510 (manufactured by Toagosei Co., Ltd.), and PGMEA were added to 1 g of the reaction liquid obtained in Synthesis Example 1, and dilution was performed with PGME such that the solid content concentration became 4% by weight and the concentration of PGMEA became 30% by weight; thus, a release layer-forming composition A9 was prepared.

[4] Production of Release Layer and Resin Substrate-1

Example 2-1

Using a spin coater (conditions: at a rotation rate of 1,000 rpm for approximately 30 seconds), the release layer-forming composition A1 was applied on a glass substrate (100 mm×100 mm, the same applies hereinafter) that was a base body. The obtained coating film was heated at 100° C. for 2 minutes by using a hot plate, subsequently heating was performed at 230° C. for 10 minutes by using a hot plate, and a release layer with a thickness of approximately 0.1 Lm was formed on the glass substrate; thus, a release layer-equipped glass substrate was obtained.

Immediately after that, using a spin coater (conditions: at a rotation rate of 200 rpm for approximately 15 seconds), the composition for forming a resin substrate F, 1 was applied on the release layer (resin thin film) on the glass substrate. The obtained coating film was heated at 80° C. for 2 minutes by using a hot plate, then heating was performed at 230° C. for 30 minutes by using a hot plate, and a resin substrate with a thickness of approximately 3 Lm was formed on the release layer; thus, a resin substrate/release layer-equipped glass substrate was obtained. After that, the light transmittance was measured using an ultraviolet-visible spectrophotometer (UV-2600, manufactured by Shimadzu Corporation); as a result, the resin substrate showed a transmittance of more than or equal to 90% at 400 nm.

Example 2-2

A release layer and a resin substrate were produced by a similar method to Example 2-1 except that the composition for forming a resin substrate F2 was used in place of the composition for forming a resin substrate F1; thus, a release layer-equipped glass substrate and a resin substrate/release layer-equipped glass substrate were obtained. After that, the light transmittance was measured using an ultraviolet-visible spectrophotometer (UV-2600, manufactured by Shimadzu Corporation); as a result, the resin substrate showed a transmittance of more than or equal to 90% at 400 nm.

Example 2-3

A release layer and a resin substrate were produced by a similar method to Example 2-1 except that the release layer-forming composition A2 was used in place of the release layer-forming composition A1; thus, a release layer-equipped glass substrate and a resin substrate/release layer-equipped glass substrate were obtained.

Example 2-4

A release layer and a resin substrate were produced by a similar method to Example 2-1 except that the release layer-forming composition A3 was used in place of the release layer-forming composition A1; thus, a release layer-equipped glass substrate and a resin substrate/release layer-equipped glass substrate were obtained.

Example 2-5

A release layer and a resin substrate were produced by a similar method to Example 2-1 except that the release layer-forming composition A4 was used in place of the release layer-forming composition A1; thus, a release layer-equipped glass substrate and a resin substrate/release layer-equipped glass substrate were obtained.

Comparative Example 2-1

A release layer and a resin substrate were produced by a similar method to Example 2-1 except that the release layer-forming composition A5 was used in place of the release layer-forming composition A1; thus, a release layer-equipped glass substrate and a resin substrate/release layer-equipped glass substrate were obtained.

Comparative Example 2-2

A release layer and a resin substrate were produced by a similar method to Example 2-1 except that the release layer-forming composition A6 was used in place of the release layer-forming composition A1; thus, a release layer-equipped glass substrate and a resin substrate/release layer-equipped glass substrate were obtained.

Comparative Example 2-3

A release layer and a resin substrate were produced by a similar method to Example 2-1 except that the release layer-forming composition A7 was used in place of the release layer-forming composition A1; thus, a release layer-equipped glass substrate and a resin substrate/release layer-equipped glass substrate were obtained.

Comparative Example 2-4

A release layer and a resin substrate were produced by a similar method to Example 2-1 except that the release layer-forming composition A8 was used in place of the release layer-forming composition A1; thus, a release layer-equipped glass substrate and a resin substrate/release layer-equipped glass substrate were obtained.

Comparative Example 2-5

A release layer and a resin substrate were produced by a similar method to Example 2-1 except that the release layer-forming composition A9 was used in place of the release layer-forming composition A1 and the composition for forming a resin substrate F2 was used in place of the composition for forming a resin substrate F1; thus, a release layer-equipped glass substrate and a resin substrate/release layer-equipped glass substrate were obtained.

[5] Evaluation of Releasability-1

For each of the resin substrate/release layer-equipped glass substrates obtained in Examples 2-1 to 2-5 and Comparative Examples 2-1 to 2-5 described above, the releasability between the release layer and the glass substrate or the resin substrate was found by the following methods. The following tests were performed using the same glass substrate.

(1) Evaluation of Stickiness Between Release Layer and Glass Substrate

The release layer on the release layer-equipped glass substrate obtained in each of Examples 2-1 to 2-5 and Comparative Examples 2-1 to 2-5 was crosscut (at 2 mm intervals vertically and horizontally, the same applies hereinafter); thus, 25-square cutting was performed. That is, 25 squares each with 2-mm sides were formed by this cross-cutting.

An adhesive tape was adhered to the 25 square cut portions, and the tape was peeled off; and stickiness was evaluated on the basis of the following criteria. The results are shown in Table 1.

<Assessment Criteria>
5B: Peeling of 0% (no peeling)
4B: Peeling of less than 5%
3B: Peeling of 5% to less than 15%
2B: Peeling of 15% to less than 35%
1B: Peeling of 35% to less than 65%
0B: Peeling of 65% to less than 80%
B: Peeling of 80% to less than 95%
A: Peeling of 95% to less than 100%
AA: Peeling of 100% (all the squares were peeled off)

(2) Evaluation of Release Force Between Release Layer and Resin Substrate

A 25 mm×50 mm strip was produced on the resin substrate/release layer-equipped glass substrate obtained in each of Examples 2-1 to 2-5 and Comparative Examples 2-1 to 2-5. Further, Cellotape (registered trademark) (CT-24, manufactured by Nichiban Co., Ltd.) was adhered; then, using AUTOGRAPH AGS-X500N (manufactured by Shimadzu Corporation), release was performed at a release angle of 90° and a release rate of 300 mm/min, and the release force was measured. One that was unable to be released was classified as unreleasable. The results are shown in Table 1.

(3) Change in Release Force of Release Layer 1

After a release layer-equipped glass substrate was obtained, it was allowed to stand for one day in an environment at 23° C. at a humidity of 50%. After that, a resin substrate/release layer-equipped glass substrate was obtained in a similar manner to Example 1-1. The release force was measured in a similar manner to the evaluation of the release force between the release layer and the resin substrate, and the amount of change in release force was found. The change in release force was assessed in the following way. The results are shown in Table 1.

⊚: Changes in release force of more than or equal to 0% and less than 10%
○: Changes in release force of more than or equal to 10% and less than 30%
Δ: Changes in release force of more than or equal to 30% and less than 50%
X: Changes in release force of more than or equal to 50%
--: Not measured (4) Change in Release Force of Release Layer 2

A resin substrate/release layer-equipped glass substrate was obtained in a similar manner to Example 1-1. After that, heating was performed at 230° C. for 2 hours by using a hot plate. The release force was measured in a similar manner to the evaluation of the release force between the release layer and the resin substrate, and the amount of change in release force was found. The change in release force was assessed in the following way. The results are shown in Table 1.

⊚: Changes in release force of more than or equal to 0% and less than 10%
○: Changes in release force of more than or equal to 10% and less than 30%
Δ: Changes in release force of more than or equal to 30% and less than 50%
X: Changes in release force of more than or equal to 50%
--: Not measured

TABLE 1

| | Composition for forming release layer | Composition for forming resin substrate | Stickiness between release layer and glass base body | Release force between resin substrate and release layer (N/25 mm) | Change in release force of release layer 1 | Change in release force of release layer 2 |
|---|---|---|---|---|---|---|
| Example 2-1 | A1 | F1 | 5B | 0.04 | ⊚ | ⊚ |
| Example 2-2 | A1 | F2 | 5B | 0.04 | ⊚ | ⊚ |
| Example 2-3 | A2 | F1 | 5B | 0.03 | ⊚ | ⊚ |
| Example 2-4 | A3 | F1 | 5B | 0.03 | ⊚ | ⊚ |
| Example 2-5 | A4 | F1 | 5B | 0.09 | ⊚ | ⊚ |
| Comparative Example 2-1 | A5 | F1 | 5B | 1.92 | — | — |
| Comparative Example 2-2 | A6 | F1 | 5B | Film manufacturing impossible | — | — |

TABLE 1-continued

|  | Composition for forming release layer | Composition for forming resin substrate | Stickiness between release layer and glass base body | Release force between resin substrate and release layer (N/25 mm) | Change in release force of release layer 1 | Change in release force of release layer 2 |
| --- | --- | --- | --- | --- | --- | --- |
| Comparative Example 2-3 | A7 | F1 | 5B | Unreleasable | — | — |
| Comparative Example 2-4 | A8 | F1 | 5B | 0.15 | X | — |
| Comparative Example 2-5 | A9 | F2 | 5B | Unreleasable | — | — |

From the results shown in Table 1, it has been found that the release layer of each of the Examples is excellent in stickiness with the glass substrate and yet is easily released from the resin film. Further, it has been found that the release layer does not change in release force even after stored in a film formation state and is excellent in stability after film formation. Further, it has been found that the release layer does not change in release force even after exposed to a high temperature environment and has high heat resistance.

On the other hand, it has been found that the release layer of each of the Comparative Examples, although it is excellent in stickiness with the glass substrate, is poor in releasability with the resin substrate.

[6] Preparation of Composition for Forming Release Layer-2

[Example 3-1] Preparation of Release Layer-Forming Composition B1

0.05 g of PL-LI, 0.01 g of PPTS, 0.15 g of the acrylic polymer (S1') solution, and PGMEA were added to 1 g of the reaction liquid obtained in Synthesis Example 1, and dilution was performed with PGME such that the solid content concentration became 5% by weight and the concentration of PGMEA became 30% by weight; thus, a release layer-forming composition B 1 was prepared.

[Example 3-2] Preparation of Release Layer-Forming Composition B2

0.05 g of PL-LI, 0.01 g of PPTS, 0.8 g of the acrylic polymer (S1') solution, and PGMEA were added to 1 g of the reaction liquid obtained in Synthesis Example 1, and dilution was performed with PGME such that the solid content concentration became 5% by weight and the concentration of PGMEA became 30% by weight; thus, a release layer-forming composition B2 was prepared.

[Example 3-3] Preparation of Release Layer-Forming Composition B3

0.05 g of PL-LI, 0.01 g of PPTS, 0.10 g of the acrylic polymer (S2') solution, and PGMEA were added to 1 g of the reaction liquid obtained in Synthesis Example 1, and dilution was performed with PGME such that the solid content concentration became 5% by weight and the concentration of PGMEA became 30% by weight; thus, a release layer-forming composition B3 was prepared.

[Example 3-4] Preparation of Release Layer-Forming Composition B4

A release layer-forming composition B4 was prepared by a similar method to Example 3-1 except that the acrylic polymer (S2') solution was used in place of the acrylic polymer (S1') solution.

[Example 3-5] Preparation of Release Layer-Forming Composition B5

0.04 g of PL-LI, 0.01 g of PPTS, 0.05 g of the acrylic polymer (S3') solution, and PGMEA were added to 1 g of the reaction liquid obtained in Synthesis Example 1, and dilution was performed with PGME such that the solid content concentration became 1% by weight and the concentration of PGMEA became 30% by weight; thus, a release layer-forming composition B5 was prepared.

[Example 3-6] Preparation of Release Layer-Forming Composition B6

A release layer-forming composition B6 was prepared by a similar method to Example 3-5 except that the acrylic polymer (S4') solution was used in place of the acrylic polymer (S3') solution.

[Comparative Example 3-1] Preparation of Release Layer-Forming Composition B7

A release layer-forming composition B7 was prepared by a similar method to Example 3-5 except that the acrylic polymer (CS1) solution was used in place of the acrylic polymer (S3') solution.

[Comparative Example 3-2] Preparation of Release Layer-Forming Composition B8

A release layer-forming composition B8 was prepared by a similar method to Example 3-5 except that the acrylic polymer (CS2) solution was used in place of the acrylic polymer (S3') solution.

[Comparative Example 3-3] Preparation of Release Layer-Forming Composition B9

PGMEA was added to 5.0 g of a phenol novolac resin TD2131 (manufactured by DIC Corporation) and 1.0 g of BMI70, and dilution was performed with PGME such that the solid content concentration became 5% by weight and the concentration of PGMEA became 30% by weight; thus, a release layer-forming composition B9 was prepared.

[Comparative Example 3-4] Preparation of Release Layer-Forming Composition B 10

0.04 g of PL-LI, 0.01 g of paratoluenesulfonic acid, 1.06 g of a non-fluorine-based acrylic polymer UC-3510 (manufactured by Toagosei Co., Ltd.), and PGMEA were added to 1 g of the reaction liquid obtained in Synthesis Example 1, and dilution was performed with PGME such that the solid content concentration became 4% by weight and the concentration of PGMEA became 30% by weight; thus, a release layer-forming composition B 10 was prepared.

[7] Production of Release Layer and Resin Substrate-2

Example 4-1

Using a spin coater (conditions: at a rotation rate of 1,000 rpm for approximately 30 seconds), the release layer-forming composition B1 was applied on a glass substrate (100 mm×100 mm, the same applies hereinafter) that was a base body. The obtained coating film was heated at 100° C. for 2 minutes by using a hot plate, subsequently heating was performed at 230° C. for 10 minutes by using a hot plate, and a release layer with a thickness of approximately 0.1 Lm was formed on the glass substrate; thus, a release layer-equipped glass substrate was obtained.

Immediately after that, using a spin coater (conditions: at a rotation rate of 200 rpm for approximately 15 seconds), the composition for forming a resin substrate F, 1 was applied on the release layer (resin thin film) on the glass substrate. The obtained coating film was heated at 80° C. for 2 minutes by using a hot plate, then heating was performed at 230° C. for 30 minutes by using a hot plate, and a resin substrate with a thickness of approximately 3 Lm was formed on the release layer; thus, a resin substrate/release layer-equipped glass substrate was obtained. After that, the light transmittance was measured using an ultraviolet-visible spectrophotometer (UV-2600, manufactured by Shimadzu Corporation); as a result, the resin substrate showed a transmittance of more than or equal to 90% at 400 nm.

Example 4-2

A release layer and a resin substrate were produced by a similar method to Example 4-1 except that the composition for forming a resin substrate F2 was used in place of the composition for forming a resin substrate F1; thus, a release layer-equipped glass substrate and a resin substrate/release layer-equipped glass substrate were obtained. After that, the light transmittance was measured using an ultraviolet-visible spectrophotometer (UV-2600, manufactured by Shimadzu Corporation); as a result, the resin substrate showed a transmittance of more than or equal to 90% at 400 nm.

Example 4-3

A release layer and a resin substrate were produced by a similar method to Example 4-1 except that the release layer-forming composition B2 was used in place of the release layer-forming composition B1; thus, a release layer-equipped glass substrate and a resin substrate/release layer-equipped glass substrate were obtained.

Example 4-4

A release layer and a resin substrate were produced by a similar method to Example 4-1 except that the release layer-forming composition B3 was used in place of the release layer-forming composition B1; thus, a release layer-equipped glass substrate and a resin substrate/release layer-equipped glass substrate were obtained.

Example 4-5

A release layer and a resin substrate were produced by a similar method to Example 4-1 except that the release layer-forming composition B4 was used in place of the release layer-forming composition B1; thus, a release layer-equipped glass substrate and a resin substrate/release layer-equipped glass substrate were obtained.

Example 4-6

A release layer and a resin substrate were produced by a similar method to Example 4-1 except that the release layer-forming composition B5 was used in place of the release layer-forming composition B1; thus, a release layer-equipped glass substrate and a resin substrate/release layer-equipped glass substrate were obtained.

Example 4-7

A release layer and a resin substrate were produced by a similar method to Example 4-1 except that the release layer-forming composition B6 was used in place of the release layer-forming composition B1; thus, a release layer-equipped glass substrate and a resin substrate/release layer-equipped glass substrate were obtained.

Comparative Example 4-1

A release layer and a resin substrate were produced by a similar method to Example 4-1 except that the release layer-forming composition B7 was used in place of the release layer-forming composition B1; thus, a release layer-equipped glass substrate and a resin substrate/release layer-equipped glass substrate were obtained.

Comparative Example 4-2

A release layer and a resin substrate were produced by a similar method to Example 4-1 except that the release layer-forming composition B8 was used in place of the release layer-forming composition B1; thus, a release layer-equipped glass substrate and a resin substrate/release layer-equipped glass substrate were obtained.

Comparative Example 4-3

A release layer and a resin substrate were produced by a similar method to Example 4-1 except that the release layer-forming composition B9 was used in place of the release layer-forming composition B1; thus, a release layer-equipped glass substrate and a resin substrate/release layer-equipped glass substrate were obtained.

Comparative Example 4-4

A release layer and a resin substrate were produced by a similar method to Example 4-1 except that the release layer-forming composition B 10 was used in place of the release layer-forming composition B 1; thus, a release layer-equipped glass substrate and a resin substrate/release layer-equipped glass substrate were obtained.

[8] Evaluation of Releasability-2

For each of the resin substrate/release layer-equipped glass substrates obtained in Examples 4-1 to 4-7 and Comparative Examples 4-1 to 4-4 described above, the releasability between the release layer and the glass substrate or the resin substrate was found by the following methods. The following tests were performed using the same glass substrate.

(1) Evaluation of Stickiness Between Release Layer and Glass Substrate

The release layer on the release layer-equipped glass substrate obtained in each of Examples 4-1 to 4-7 and Comparative Examples 4-1 to 4-4 was crosscut (at 2 mm intervals vertically and horizontally, the same applies hereinafter); thus, 25-square cutting was performed. That is, 25 squares each with 2-mm sides were formed by this crosscutting.

An adhesive tape was adhered to the 25 square cut portions, and the tape was peeled off; and stickiness was evaluated on the basis of the following criteria. The results are shown in Table 2.

<Assessment Criteria>
5B: Peeling of 0% (no peeling)
4B: Peeling of less than 5%
3B: Peeling of more than or equal to 5% to less than 15%
2B: Peeling of more than or equal to 15% to less than 35%
1B: Peeling of more than or equal to 35% to less than 65%
0B: Peeling of more than or equal to 65% to less than 80%
B: Peeling of more than or equal to 80% to less than 95%
A: Peeling of more than or equal to 95% to less than 100%
AA: Peeling of 100% (all the squares were peeled off)

(2) Evaluation of Release Force Between Release Layer and Resin Substrate

A 25 mm×50 mm strip was produced on the resin substrate/release layer-equipped glass substrate obtained in each of Examples 4-1 to 4-7 and Comparative Examples 4-1 to 4-4. Further, Cellotape (registered trademark) (CT-24, manufactured by Nichiban Co., Ltd.) was adhered; then, using AUTOGRAPH AGS-X500N (manufactured by Shimadzu Corporation), release was performed at a release angle of 90° and a release rate of 300 mm/min, and the release force was measured. One that was unable to be released was classified as unreleasable. The results are shown in Table 2.

(3) Change in Release Force of Release Layer

After a release layer-equipped glass substrate was obtained, it was allowed to stand for one day in an environment at 23° C. at a humidity of 50%. After that, a resin substrate/release layer-equipped glass substrate was obtained in a similar manner to Example 4-1. The release force was measured in a similar manner to the evaluation of the release force between the release layer and the resin substrate, and was compared with the release force in the case where a resin substrate was produced immediately after the formation of a release layer; thereby, the amount of change in release force was found. The change in release force was evaluated on the basis of the following criteria. The results are shown in Table 2.

<Assessment Criteria>
◎: Changes in release force of more than or equal to 0% and less than 10%
○: Changes in release force of more than or equal to 10% and less than 30%
Δ: Changes in release force of more than or equal to 30% and less than 50%
X: Changes in release force of more than or equal to 50%
--: Not measured

TABLE 2

| | Composition for forming release layer | Composition for forming resin substrate | Stickiness between release layer and glass base body | Release force between resin substrate and release layer (N/25 mm) | Change in release force of release layer |
|---|---|---|---|---|---|
| Example 4-1 | B1 | F1 | 5B | 0.11 | ◎ |
| Example 4-2 | B1 | F2 | 5B | 0.11 | ◎ |
| Example 4-3 | B2 | F1 | 5B | 0.10 | ◎ |
| Example 4-4 | B3 | F1 | 5B | 0.10 | ◎ |
| Example 4-5 | B4 | F1 | 5B | 0.12 | ◎ |
| Example 4-6 | B5 | F1 | 5B | 0.21 | — |
| Example 4-7 | B6 | F1 | 5B | 0.18 | — |
| Comparative Example 4-1 | B7 | F1 | 5B | 1.92 | — |
| Comparative Example 4-2 | B8 | F1 | 5B | Film manufacturing impossible | — |
| Comparative Example 4-3 | B9 | F1 | 5B | Unreleasable | — |
| Comparative Example 4-4 | B10 | F1 | 5B | Unreleasable | — |

From the results shown in Table 2, it has been found that the release layer of each of the Examples is excellent in stickiness with the glass substrate and yet is excellent in releasability with the resin substrate. Further, it has been found that the release layer of each of the Examples does not change in release force even after stored in a film formation state and is excellent in stability after film formation. On the other hand, it has been found that the release layer of each of the Comparative Examples, although it is excellent in stickiness with the glass substrate, is poor in releasability with the resin substrate.

[9] Preparation of Composition for Forming Release Layer-3

[Example 5-1] Preparation of Release Layer-Forming Composition C1

0.05 g of PL-LI, 0.01 g of PPTS, 0.15 g of the acrylic polymer (S1″) solution, and PGMEA were added to 1 g of the reaction liquid obtained in Synthesis Example 1, and dilution was performed with PGME such that the solid content concentration became 5% by weight and the concentration of PGMEA became 30% by weight; thus, a release layer-forming composition C1 was prepared.

[Example 5-2] Preparation of Release Layer-Forming Composition C2

A release layer-forming composition C2 was prepared by a similar method to Example 5-1 except that the acrylic polymer (S2") solution was used in place of the acrylic polymer (S1") solution.

[Example 5-3] Preparation of Release Layer-Forming Composition C3

A release layer-forming composition C3 was prepared by a similar method to Example 5-1 except that the acrylic polymer (S3") solution was used in place of the acrylic polymer (S1") solution.

[Example 5-4] Preparation of Release Layer-Forming Composition C4

0.04 g of PL-LI, 0.01 g of PPTS, 0.08 g of the acrylic polymer (S3") solution, and PGMEA were added to 1 g of the reaction liquid obtained in Synthesis Example 1, and dilution was performed with PGME such that the solid content concentration became 5% by weight and the concentration of PGMEA became 30% by weight; thus, a release layer-forming composition C4 was prepared.

[Comparative Example 5-1] Preparation of Release Layer-Forming Composition C5

0.04 g of PL-LI, 0.01 g of PPTS, 0.05 g of the acrylic polymer (CS1) solution, and PGMEA were added to 1 g of the reaction liquid obtained in Synthesis Example 1, and dilution was performed with PGME such that the solid content concentration became 1% by weight and the concentration of PGMEA became 30% by weight; thus, a release layer-forming composition C5 was prepared.

[Comparative Example 5-2] Preparation of Release Layer-Forming Composition C6

A release layer-forming composition C6 was prepared by a similar method to Comparative Example 5-1 except that the acrylic polymer (CS2) solution was used in place of the acrylic polymer (CS1) solution.

[Comparative Example 5-3] Preparation of Release Layer-Forming Composition C7

PGMEA was added to 5.0 g of a phenol novolac resin TD2131 (manufactured by DIC Corporation) and 1.0 g of BMI70, and dilution was performed with PGME such that the solid content concentration became 5% by weight and the concentration of PGMEA became 30% by weight; thus, a release layer-forming composition C7 was prepared.

[Comparative Example 5-4] Preparation of Release Layer-Forming Composition C8

0.04 g of PL-LI, 0.01 g of paratoluenesulfonic acid, 1.06 g of a non-fluorine-based acrylic polymer UC-3510 (manufactured by Toagosei Co., Ltd.), and PGMEA were added to 1 g of the reaction liquid obtained in Synthesis Example 1, and dilution was performed with PGME such that the solid content concentration became 4% by weight and the concentration of PGMEA became 30% by weight; thus, a release layer-forming composition C8 was prepared.

[10] Production of Release Layer and Resin Substrate-3

Example 6-1

Using a spin coater (conditions: at a rotation rate of 1,000 rpm for approximately 30 seconds), the release layer-forming composition C1 was applied on a glass substrate (100 mm×100 mm, the same applies hereinafter) that was a base body. The obtained coating film was heated at 100° C. for 2 minutes by using a hot plate, subsequently heating was performed at 230° C. for 10 minutes by using a hot plate, and a release layer with a thickness of approximately 0.1 μm was formed on the glass substrate; thus, a release layer-equipped glass substrate was obtained.

Immediately after that, using a spin coater (conditions: at a rotation rate of 200 rpm for approximately 15 seconds), the composition for forming a resin substrate F1 was applied on the release layer (resin thin film) on the glass substrate. The obtained coating film was heated at 80° C. for 2 minutes by using a hot plate, then heating was performed at 230° C. for 30 minutes by using a hot plate, and a resin substrate with a thickness of approximately 3 μm was formed on the release layer; thus, a resin substrate/release layer-equipped glass substrate was obtained. After that, the light transmittance was measured using an ultraviolet-visible spectrophotometer (UV-2600, manufactured by Shimadzu Corporation); as a result, the resin substrate showed a transmittance of more than or equal to 90% at 400 nm.

Example 6-2

A release layer and a resin substrate were produced by a similar method to Example 6-1 except that the release layer-forming composition C2 was used in place of the release layer-forming composition C1; thus, a release layer-equipped glass substrate and a resin substrate/release layer-equipped glass substrate were obtained.

Example 6-3

A release layer and a resin substrate were produced by a similar method to Example 6-1 except that the release layer-forming composition C3 was used in place of the release layer-forming composition C1; thus, a release layer-equipped glass substrate and a resin substrate/release layer-equipped glass substrate were obtained.

Example 6-4

A release layer and a resin substrate were produced by a similar method to Example 6-1 except that the release layer-forming composition C4 was used in place of the release layer-forming composition C1; thus, a release layer-equipped glass substrate and a resin substrate/release layer-equipped glass substrate were obtained.

Example 6-5

A release layer and a resin substrate were produced by a similar method to Example 6-4 except that the composition for forming a resin substrate F2 was used in place of the composition for forming a resin substrate F1; thus, a release layer-equipped glass substrate and a resin substrate/release layer-equipped glass substrate were obtained. After that, the light transmittance was measured using an ultraviolet-visible spectrophotometer (UV-2600, manufactured by Shimadzu Corporation); as a result, the resin substrate showed a transmittance of more than or equal to 90% at 400 nm.

Comparative Example 6-1

A release layer and a resin substrate were produced by a similar method to Example 6-1 except that the release layer-forming composition C5 was used in place of the release layer-forming composition C1; thus, a release layer-equipped glass substrate and a resin substrate/release layer-equipped glass substrate were obtained.

Comparative Example 6-2

A release layer and a resin substrate were produced by a similar method to Example 6-1 except that the release layer-forming composition C6 was used in place of the release layer-forming composition C1; thus, a release layer-equipped glass substrate and a resin substrate/release layer-equipped glass substrate were obtained.

Comparative Example 6-3

A release layer and a resin substrate were produced by a similar method to Example 6-1 except that the release layer-forming composition C7 was used in place of the release layer-forming composition C1; thus, a release layer-equipped glass substrate and a resin substrate/release layer-equipped glass substrate were obtained.

Comparative Example 6-4

A release layer and a resin substrate were produced by a similar method to Example 6-1 except that the release layer-forming composition C8 was used in place of the release layer-forming composition C1; thus, a release layer-equipped glass substrate and a resin substrate/release layer-equipped glass substrate were obtained.

[11] Evaluation of Releasability-3

For each of the resin substrate/release layer-equipped glass substrates obtained in Examples 6-1 to 6-5 and Comparative Examples 6-1 to 6-4 described above, the releasability between the release layer and the glass substrate or the resin substrate was found by the following methods. The following tests were performed using the same glass substrate.

(1) Evaluation of Stickiness Between Release Layer and Glass Substrate

The release layer on the release layer-equipped glass substrate obtained in each of Examples 6-1 to 6-5 and Comparative Examples 6-1 to 6-4 was crosscut (at 2 mm intervals vertically and horizontally, the same applies hereinafter); thus, 25-square cutting was performed. That is, 25 squares each with 2-mm sides were formed by this crosscutting.

An adhesive tape was adhered to the 25 square cut portions, and the tape was peeled off; and stickiness was evaluated on the basis of the following criteria. The results are shown in Table 3.
<Assessment Criteria>
  5B: Peeling of 0% (no peeling)
  4B: Peeling of less than 5%
  3B: Peeling of more than or equal to 5% to less than 15%
  2B: Peeling of more than or equal to 15% to less than 35%
  1B: Peeling of more than or equal to 35% to less than 65%
  0B: Peeling of more than or equal to 65% to less than 80%
  B: Peeling of more than or equal to 80% to less than 95%
  A: Peeling of more than or equal to 95% to less than 100%
  AA: Peeling of 100% (all the squares were peeled off)
(2) Evaluation of Release Force Between Release Layer and Resin Substrate A 25 mm×50 mm strip was produced on the resin substrate/release layer-equipped glass substrate obtained in each of Examples 6-1 to 6-5 and Comparative Examples 6-1 to 6-4. Further, Cellotape (registered trademark) (CT-24, manufactured by Nichiban Co., Ltd.) was adhered; then, using AUTOGRAPH AGS-X500N (manufactured by Shimadzu Corporation), release was performed at a release angle of 90° and a release rate of 300 mm/min, and the release force was measured. One that was unable to be released was classified as unreleasable. The results are shown in Table 3.

(3) Change in Release Force of Release Layer

After a release layer-equipped glass substrate was obtained, it was allowed to stand for one day in an environment at 23° C. at a humidity of 50%. After that, a resin substrate/release layer-equipped glass substrate was obtained in a similar manner to Example 6-1. The release force was measured in a similar manner to the evaluation of the release force between the release layer and the resin substrate, and was compared with the release force in the case where a resin substrate was produced immediately after the formation of a release layer; thereby, the amount of change in release force was found. The change in release force was evaluated on the basis of the following criteria. The results are shown in Table 3.
<Assessment Criteria>
  ⊚: Changes in release force of more than or equal to 0% and less than 10%
  ○: Changes in release force of more than or equal to 10% and less than 30%
  Δ: Changes in release force of more than or equal to 30% and less than 50%
  X: Changes in release force of more than or equal to 50%
  --: Not measured

TABLE 3

| | Composition for forming release layer | Composition for forming resin substrate | Stickiness between release layer and glass base body | Release force between resin substrate and release layer (N/25 mm) | Change in release force of release layer |
|---|---|---|---|---|---|
| Example 6-1 | C1 | F1 | 5B | 0.12 | ⊚ |
| Example 6-2 | C2 | F1 | 5B | 0.15 | ⊚ |
| Example 6-3 | C3 | F1 | 5B | 0.10 | ⊚ |
| Example 6-4 | C4 | F1 | 5B | 0.13 | ⊚ |
| Example 6-5 | C4 | F2 | 5B | 0.13 | ⊚ |
| Comparative Example 6-1 | C5 | F1 | 5B | 1.92 | — |

TABLE 3-continued

|  | Composition for forming release layer | Composition for forming resin substrate | Stickiness between release layer and glass base body | Release force between resin substrate and release layer (N/25 mm) | Change in release force of release layer |
|---|---|---|---|---|---|
| Comparative Example 6-2 | C6 | F1 | 5B | Film manufacturing impossible | — |
| Comparative Example 6-3 | C7 | F1 | 5B | Unreleasable | — |
| Comparative Example 6-4 | C8 | F1 | 5B | Unreleasable | — |

From the results shown in Table 3, it has been found that the release layer of each of the Examples is excellent in stickiness with the glass substrate and yet is excellent in releasability with the resin substrate. Further, it has been found that the release layer of each of the Examples does not change in release force even after stored in a film formation state and is excellent in stability after film formation. On the other hand, it has been found that the release layer of each of the Comparative Examples, although it is excellent in stickiness with the glass substrate, is poor in releasability with the resin substrate.

The invention claimed is:

1. A release layer-forming composition, comprising:
(A) a polyurea including a repeating unit represented by formula (1) below;
(B) an acid compound or a salt thereof;
(C) a crosslinking agent selected from compounds having a nitrogen atom substituted with a hydroxyalkyl group and/or an alkoxymethyl group;
(D) a polymeric additive including a repeating unit represented by formula (a1) below, a repeating unit represented by formula (b) below, and a repeating unit represented by formula (c) below; and
(E) a solvent,
wherein the polymeric additive (D) is contained at 5 to 100 parts by weight per 100 parts by weight of the polyurea (A):

[Chem. 1]

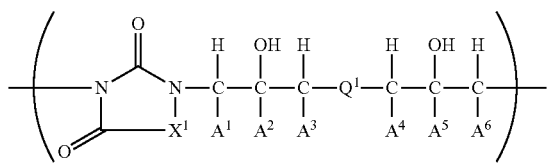
(1)

wherein $A^1$, $A^2$, $A^3$, $A^4$, $A^5$, and $A^6$ are each independently a hydrogen atom, a methyl group, or an ethyl group, and $X^1$ is a group represented by formula (1-1), (1-2), (1-3), or (1-4) below,

[Chem. 2]

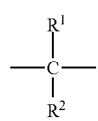
(1-1)

-continued

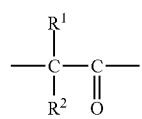
(1-2)

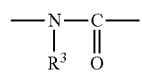
(1-3)

(1-4)

wherein $R^1$ and $R^2$ are each independently a hydrogen atom, an alkyl group having 1 to 6 carbon atoms, an alkenyl group having 3 to 6 carbon atoms, a benzyl group, or a phenyl group, the phenyl group may be substituted with at least one selected from the group consisting of an alkyl group having 1 to 6 carbon atoms, a halogen atom, an alkoxy group having 1 to 6 carbon atoms, a nitro group, a cyano group, a hydroxy group, and an alkylthio group having 1 to 6 carbon atoms, $R^1$ and $R^2$ may bond together to form a ring having 3 to 6 carbon atoms with the carbon atom to which $R^1$ and $R^2$ are bonded, $R^3$ is an alkyl group having 1 to 6 carbon atoms, an alkenyl group having 3 to 6 carbon atoms, a benzyl group, or a phenyl group, the phenyl group may be substituted with at least one selected from the group consisting of an alkyl group having 1 to 6 carbon atoms, a halogen atom, an alkoxy group having 1 to 6 carbon atoms, a nitro group, a cyano group, a hydroxy group, and an alkylthio group having 1 to 6 carbon atoms, and $Q^1$ is a group represented by formula (1-5) or (1-6) below,

[Chem. 3]

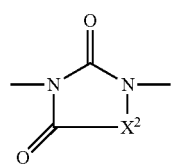
(1-5)

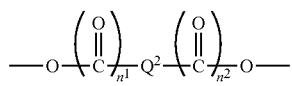
(1-6)

wherein $X^2$ is a group represented by formula (1-1), formula (1-2), or formula (1-4), $Q^2$ is an alkylene group having 1 to 10 carbon atoms, a phenylene group, a naphthylene group, or an anthrylene group, the phenylene group, the naphthylene group, and the anthrylene group may each be substituted with at least one selected from the group consisting of an alkyl group having 1 to 6 carbon atoms, a halogen atom, an alkoxy group having 1 to 6 carbon atoms, a nitro group, a cyano group, a hydroxy group, and an alkylthio group having 1 to 6 carbon atoms, and $n^2$ and $n^2$ are each independently 0 or 1,

[Chem. 4]

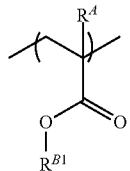

(a1)

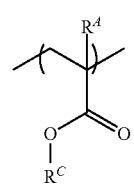

(b)

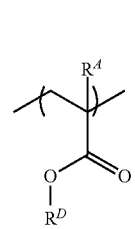

(c)

[Chem. 5]

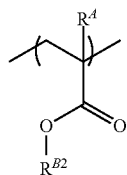

(a2)

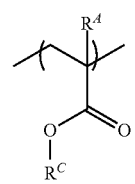

(b)

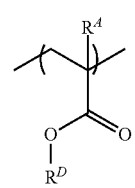

(c)

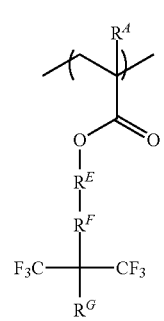

(d)

wherein $R^A$ is each independently a hydrogen atom or a methyl group, $R^{B1}$ is a branched alkyl group having 3 or 4 carbon atoms in which at least one hydrogen atom is substituted with a fluorine atom, Rc is a hydroxyalkyl group having 1 to 10 carbon atoms, and 1e is a polycyclic alkyl group having 6 to 20 carbon atoms or an aryl group having 6 to 12 carbon atoms.

2. The release layer-forming composition according to claim 1, wherein, in the repeating unit represented by formula (b) of the polymeric additive (D), Rc is a hydroxyalkyl group having 2 to 10 carbon atoms, and the carbon atom to which the hydroxy group is bonded is a secondary or tertiary carbon atom.

3. The release layer-forming composition according to claim 1, wherein, in the repeating unit represented by formula (b) of the polymeric additive (D), $R^c$ is a hydroxyalkyl group having 1 to 10 carbon atoms, the carbon atom to which the hydroxy group is bonded is a primary carbon atom, and a content ratio of repeating units represented by formula (a1) is more than or equal to 25 mol % per all the repeating units of the polymeric additive (D).

4. The release layer-forming composition according to claim 1, wherein
the polymeric additive (D) comprises a repeating unit represented by formula (a2) below, a repeating unit represented by formula (b) below, a repeating unit represented by formula (c) below, and a repeating unit represented by formula (d) below:

wherein $R^A$ is each independently a hydrogen atom or a methyl group, $R^{B2}$ is a branched alkyl group having 3 or 4 carbon atoms in which at least one hydrogen atom is substituted with a fluorine atom but that is exclusive of a 2-methyl-1,1,1,3,3,3-hexafluoroisopropyl group, $R^C$ is a hydroxyalkyl group having 1 to 10 carbon atoms, $R^D$ is a polycyclic alkyl group having 6 to 20 carbon atoms or an aryl group having 6 to 12 carbon atoms, $R^E$ is a single bond, a polycyclic alkylene group having 6 to 20 carbon atoms, or an arylene group having 6 to 12 carbon atoms, $R^F$ is a single bond or an alkylene group having 1 to 10 carbon atoms, and $R^G$ is a methyl group, an ethyl group, or a hydroxy group.

5. The release layer-forming composition according to any one of claims 1 to 4, wherein $X^1$ is a group represented by formula (1-3).

6. The release layer-forming composition according to claim 5, wherein $R^3$ is a 2-propenyl group.

7. The release layer-forming composition according to claim 1, wherein $Q^1$ is a group represented by formula (1-5).

8. The release layer-forming composition according to claim 1, wherein the component (B) is a sulfonic acid compound or a salt thereof.

9. The release layer-forming composition according to claim 1, wherein the crosslinking agent (C) is a compound represented by any one of formulae (C-1) to (C-5) below:

[Chem. 6]

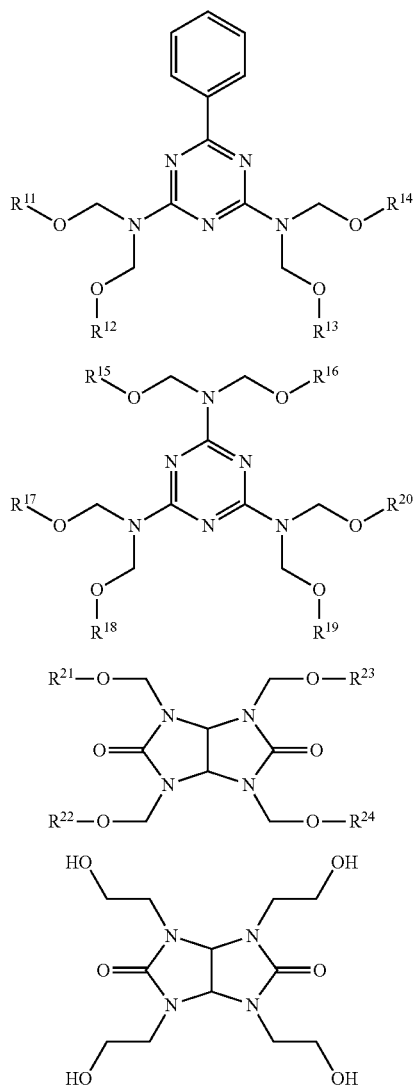

(C-1)

(C-2)

(C-3)

(C-4)

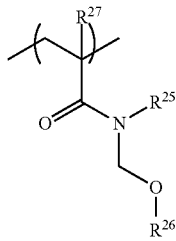

(C-5)

wherein $R^{11}$ to $R^{26}$ are each independently an alkyl group having 1 to 6 carbon atoms, and $R^{27}$ is a hydrogen atom or a methyl group.

10. The release layer-forming composition according to claim 1, wherein the content amount of the crosslinking agent (C) is 10 to 100 parts by weight per 100 parts by weight of the polyurea (A).

11. A release layer obtained from the release layer-forming composition according to claim 1.

12. A stacked body, wherein
   a resin layer in which a light transmittance at a wavelength of 400 nm is more than or equal to 80% is stacked on the release layer according to claim 11.

13. A method for manufacturing a resin substrate, comprising:
   a step of applying the release layer-forming composition according to claim 1 to a base body to form a release layer;
   a step of forming, on the release layer, a resin substrate in which a light transmittance at a wavelength of 400 nm is more than or equal to 80%; and
   a step of releasing the resin substrate by a release force of less than or equal to 0.25 N/25 mm.

* * * * *